United States Patent
Sundaram et al.

(10) Patent No.: US 10,341,224 B2
(45) Date of Patent: Jul. 2, 2019

(54) LAYER-3 FLOW CONTROL INFORMATION ROUTING SYSTEM

(71) Applicant: Dell Products L.P., Round Rock, TX (US)

(72) Inventors: Shivakumar Sundaram, Tamilnadu (IN); Ramesh Balaji Subramanian, Tamilnadu (IN)

(73) Assignee: Dell Products L.P., Round Rock, TX (US)

( * ) Notice: Subject to any disclaimer, the term of this patent is extended or adjusted under 35 U.S.C. 154(b) by 266 days.

(21) Appl. No.: 15/055,036

(22) Filed: Feb. 26, 2016

(65) Prior Publication Data

US 2016/0226773 A1 Aug. 4, 2016

Related U.S. Application Data

(63) Continuation-in-part of application No. 14/681,854, filed on Apr. 8, 2015, now Pat. No. 9,900,255, which is a continuation of application No. 13/750,666, filed on Jan. 25, 2013, now Pat. No. 9,007,906.

(51) Int. Cl.
| | |
|---|---|
| *H04L 12/815* | (2013.01) |
| *H04L 12/707* | (2013.01) |
| *H04L 12/709* | (2013.01) |
| *H04L 12/803* | (2013.01) |
| *H04L 12/935* | (2013.01) |
| *H04L 12/721* | (2013.01) |
| *H04L 12/743* | (2013.01) |

(Continued)

(52) U.S. Cl.
CPC ............. *H04L 45/24* (2013.01); *H04L 45/12* (2013.01); *H04L 45/245* (2013.01); *H04L 45/38* (2013.01); *H04L 47/125* (2013.01); *H04L 49/30* (2013.01); *H04L 45/7453* (2013.01); *H04L 47/18* (2013.01); *H04L 47/24* (2013.01)

(58) Field of Classification Search
None
See application file for complete search history.

(56) References Cited

U.S. PATENT DOCUMENTS

| | | | |
|---|---|---|---|
| 8,243,594 B1* | 8/2012 | Fotedar | H04L 45/245 370/229 |
| 9,007,906 B2 | 4/2015 | Sundaram et al. | |
| 9,363,181 B1* | 6/2016 | Nachum | H04L 47/12 |

(Continued)

*Primary Examiner* — George C Atkins
(74) *Attorney, Agent, or Firm* — Haynes and Boone, LLP

(57) ABSTRACT

A flow control information routing system includes a receiver node device coupled to a sender node device by intermediate node devices that receive data traffic directed downstream, transmit the data traffic downstream, and provide flow control information upstream that is based on the data traffic transmitted downstream. The sender node device may perform a first layer 3 routing decision to direct a traffic flow to the receiver node device along a first traffic flow path that includes first intermediate node device(s). The sender node device may then receive flow control information provided by the first intermediate node device(s) and, in response, perform a second layer 3 routing decision using the flow control information in order to direct the traffic flow to the receiver node device along a second traffic flow path that includes second intermediate node device(s) and that does not include the first intermediate node device(s).

20 Claims, 19 Drawing Sheets

(51) Int. Cl.
    *H04L 12/801*        (2013.01)
    *H04L 12/851*        (2013.01)

(56)            References Cited

U.S. PATENT DOCUMENTS

| | | | |
|---|---|---|---|
| 2006/0221974 A1* | 10/2006 | Hilla | H04L 45/60 370/394 |
| 2007/0286097 A1* | 12/2007 | Davies | H04L 45/02 370/255 |
| 2009/0238071 A1* | 9/2009 | Ray | H04L 47/10 370/235 |
| 2010/0118703 A1 | 5/2010 | Mayhew | |
| 2011/0038267 A1* | 2/2011 | Smith | H04L 43/0811 370/248 |
| 2013/0089101 A1* | 4/2013 | Kamath | H04L 47/2458 370/400 |
| 2014/0105218 A1 | 4/2014 | Anand et al. | |
| 2014/0169183 A1* | 6/2014 | Allan | H04L 43/10 370/248 |
| 2014/0198638 A1* | 7/2014 | Campbell | H04L 47/12 370/230 |
| 2014/0204738 A1* | 7/2014 | Carter | H04L 41/12 370/230 |
| 2014/0204761 A1* | 7/2014 | Durrani | H04L 47/41 370/236 |
| 2015/0215213 A1 | 7/2015 | Sundaram et al. | |

* cited by examiner

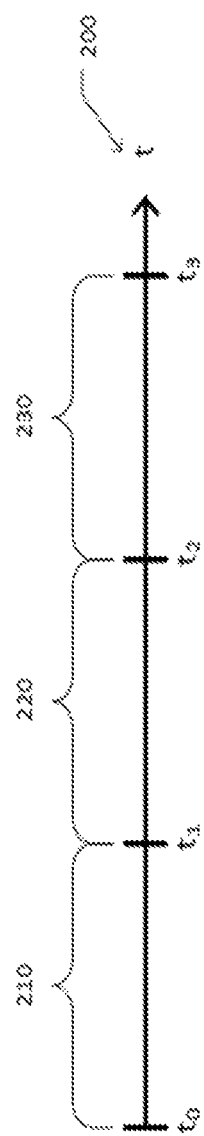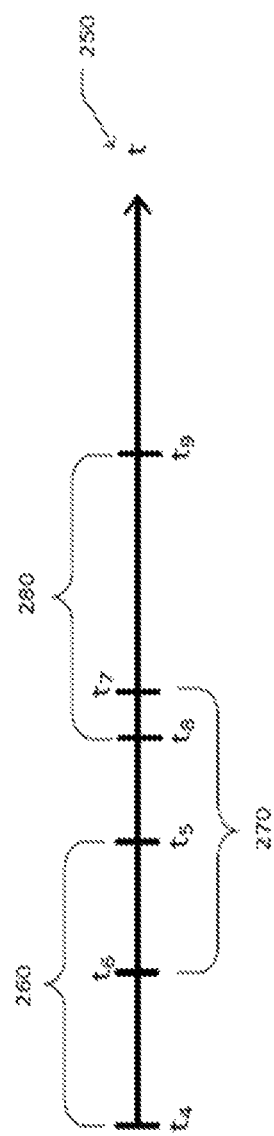

| Egress Port | Lossless Flows | Non-Lossless Flows |
|---|---|---|
| 0 | A | 1,2 |
| 1 | B | 3,4,5 |
| 2 | C | 6,7,8 |

FIG. 3a

| Egress Port | Lossless Flows | Non-Lossless Flows |
|---|---|---|
| 0 | A,D | 1,2 |
| 1 | B | 3,4,5 |
| 2 | C | 6,7,8 |

FIG. 3b

| Egress Port | Lossless Flows | Non-Lossless Flows |
|---|---|---|
| 0 | A | 1,2 |
| 1 | B | 3,4,5 |
| 2 | C,D | 6,7,8 |

FIG. 3c

LAYER-3 FLOW CONTROL INFORMATION ROUTING SYSTEM

CROSS-REFERENCE TO RELATED APPLICATIONS

This application is a continuation-in-part of U.S. Utility application Ser. No. 14/681,854, filed Apr. 8, 2015, which is a continuation of U.S. Utility application Ser. No. 13/750,666 (now U.S. Pat. No. 9,007,906), filed Jan. 25, 2013, the disclosures of which are incorporated herein by reference in their entirety.

BACKGROUND

The present disclosure relates generally to information handling systems, and more particularly to the layer-3 routing of traffic between information handling systems using flow control information.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Additionally, some embodiments of information handling systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computer networks form the interconnection fabric that enables reliable and rapid communications between computer systems and data processors that are in both close proximity to each other and at distant locations. These networks create a vast spider web of intranets and internets for handling all types of communication and information. Making all of this possible is a vast array of network switching products that make routing, switching, and forwarding decisions in order to deliver packets of information from a source system or first network node to a destination system or second network node. Due to the size, complexity, and dynamic nature of these networks, sophisticated network switching products are often required to continuously make routing, switching, and forwarding decisions and to update forwarding information as network configurations and/or conditions change. This can be further complicated through other networking trends such as network virtualization.

Many networks utilize parallelization and other techniques to improve the forwarding function between two network nodes. By employing parallelization, redundancy is built into a network so that it is possible that more than one path exists between any two nodes. This provides suitably aware network switching products with the ability to apportion network traffic by selecting between the redundant paths to avoid network congestion, balance network loads, or to avoid failures in the network. Parallelization also provides the ability to handle more network traffic between two nodes than is possible when parallelization is not utilized. In some implementations the parallelization is treated in a more formalized fashion in the form of link aggregation groups (LAGs), in which multiple network links are often bundled into a group to support the parallelization function. For suitably aware network switching products, the LAG can offer a flexible option to select any of the network links in the LAG for forwarding network traffic towards the next node in the path towards the traffic's final destination. And while LAGs offer additional flexibility in network topologies they also add complexity to the forwarding function.

Accordingly, it would be desirable to provide improved network switching products that can apportion network traffic among the network links in a LAG so as to improve network traffic flow using the LAG. It would also be desirable to provide improved network switching products that can apportion network traffic among the network links in a LAG based on dynamic network conditions.

SUMMARY

An Information Handling System (IHS) includes a communication system; a non-transitory memory system; and a processing system that is coupled to the communication system and the non-transitory memory system, wherein the processing system is configured to read instructions from the non-transitory memory system to provide a routing engine that is configured to: perform a first layer 3 routing decision to direct a first traffic flow through the communication system to a receiver node device along a first traffic flow path that includes at least one first intermediate node device; receive flow control information through the communication system that is provided by the at least one first intermediate node device; and perform a second layer 3 routing decision using the flow control information from the at least one first intermediate node device in order to direct the first traffic flow through the communication system to the receiver node device along a second traffic flow path that includes at least one second intermediate node device and that does not include the at least one first intermediate node device.

BRIEF DESCRIPTION OF THE DRAWINGS

FIGS. 2a and 2b are simplified diagrams of windowing strategies for incorporating flow control information in a LAG hashing strategy according to some embodiments.

FIG. 3a is a simplified diagram of an assignment of flows to egress ports in a LAG at a first time according to some embodiments.

FIG. 3b is a simplified diagram of an assignment of flows to egress ports in the LAG at a second time according to some embodiments.

FIG. 3c is a simplified diagram of an assignment of flows to egress ports in the LAG at a third time according to some embodiments.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1A:
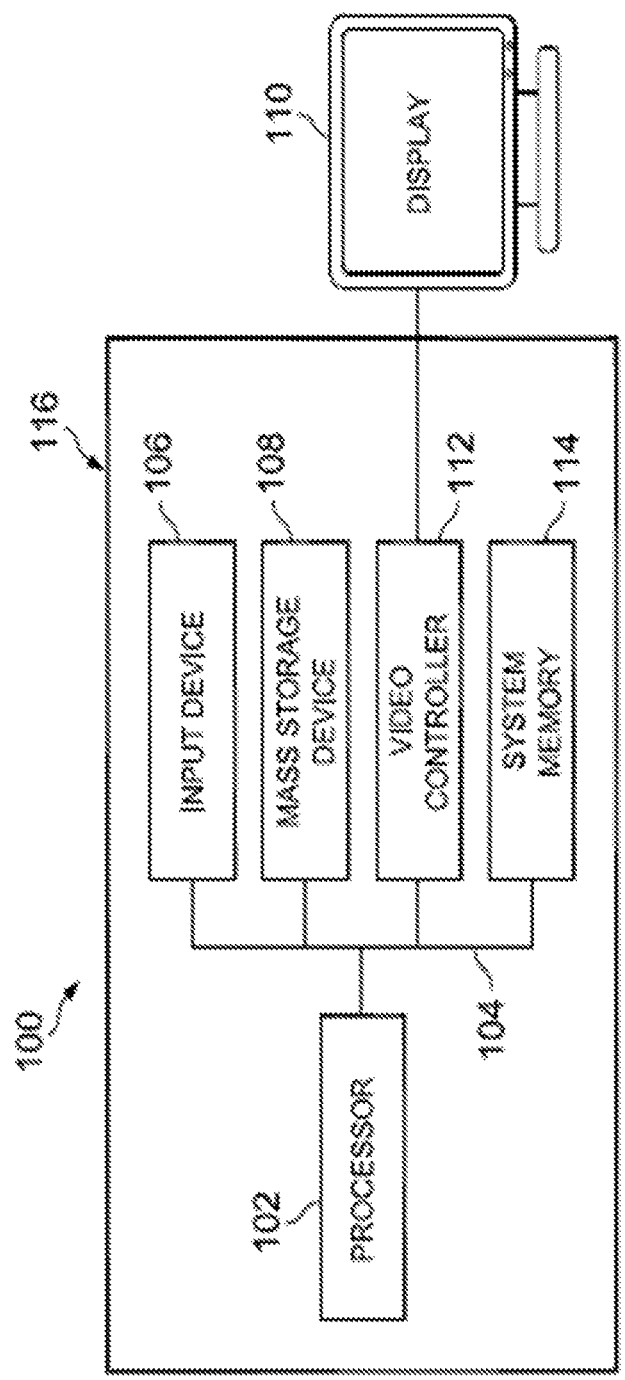
FIG. 1a is a schematic view illustrating an embodiment of an information handling system.

In one embodiment, IHS 100, FIG. 1a, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 1B:
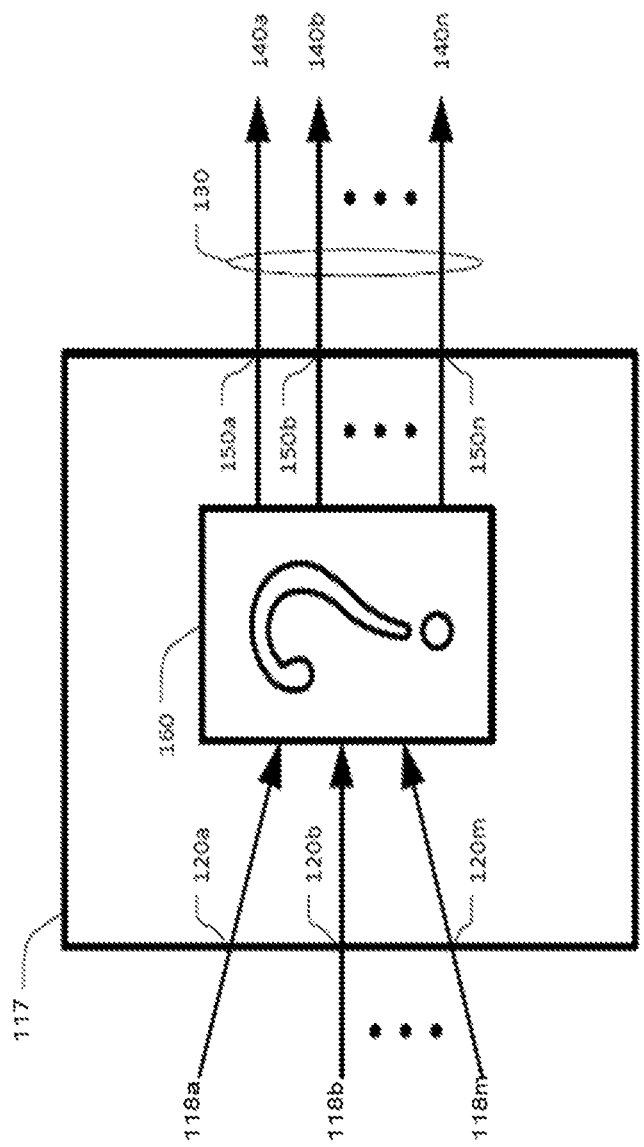
FIG. 1b is a simplified diagram of a network switching product forwarding network traffic received on multiple incoming network links using a link aggregation group according to some embodiments.

FIG. 1b is a simplified diagram of a network switching product 117 forwarding network traffic received on multiple incoming network links 118a-118m using a link aggregation group 130 according to some embodiments. As shown in FIG. 1, network switching product or switch 117 may receive network traffic on multiple incoming network links 118a-118m at corresponding ingress ports 120a-120m. Each of the incoming network links 118a-118m are capable of receiving network traffic from other nodes and/or network switching products. According to some embodiments, the network traffic may include one or more flows. Each of the one or more flows may include a stream of packets and/or packet segments being forwarded from a corresponding source node to a corresponding destination node. In some embodiments, each of the flows may be further characterized by one or more quality of service (QoS) attributes. In some embodiments, the QoS attributes may include a designation that the flow should be transmitted losslessly or non-losslessly. In some embodiments, the QoS attributes may include one or more priority designations. In some embodiments, flows with a particular QoS attribute may be forwarded to network links supporting a corresponding class of service (CoS).

The switch 117 of FIG. 1 may be configured to route, switch, or forward the flows received at ingress ports 120a-120m using a link aggregation group (LAG) 130. The LAG 130 may include one or more outgoing network links 140a-140n. Each of the one or more outgoing network links 140a-140n may transmit network traffic provided by the switch 117 at a corresponding egress port 150a-150n. According to some embodiments, the number of ingress ports M may equal the number of egress ports N. According to other embodiments, M and N may be different. Although not shown, switch 117 may further include other ingress ports for receiving network traffic and/or other egress ports for transmitting and/or forwarding network traffic.

When the switch 117 receives network traffic in a flow, it can evaluate the data in the flow to determine the desired destination for the flow. If the switch 117 determines that the flow is to be forwarded, it forwards it to an egress port according to its forwarding data structures and forwarding algorithms. In some embodiments, the egress port chosen may be the egress port with the most direct route to the desired destination. In some embodiments, the egress port may be chosen based, in part, on the QoS attributes for the flow being forwarded. In some embodiments, the egress port may be chosen based, in part, on whether it supports a class of service (CoS) consistent with the QoS attributes of the flow being forwarded. In some embodiments, where the switch 117 is utilizing a LAG, such as the LAG 130, the switch 117 may select from several egress ports 150a-150n that may provide the same route length and ability to satisfy the QoS attributes for the flow. The process of selecting an egress port in a LAG to which network traffic is to be forwarded may sometimes be referred to as hashing.

As shown in FIG. 1, switch 117 may include a LAG hashing unit 160. The LAG hashing unit 160 may receive flows from the ingress ports 120a-120m and may apportion them to the egress ports 150a-150n assigned to LAG 130 for outgoing transmission. In some embodiments, the LAG hashing unit 160 may forward the packets and/or packet segments in each of the flows to the egress ports 150a-150n in order to balance the loads handled by each egress port 150a-150n (e.g., the amount of data transmitted through each egress port 150a-150n). Several strategies and/or algorithms may be used by the LAG hashing unit 160 to apportion the flows.

One class of possible LAG hashing strategies is the class of static LAG hashing strategies. In a static LAG hashing strategy, each flow may typically be assigned to a single egress port selected from the egress ports 150a-150n. This may often be accomplished by selecting one or more fields from the headers of the packets and/or packet segments that form each flow, applying a combining function to the selected one or more fields, and then taking a modulus based on the number of egress ports 150a-150n available. As an example, the source address (e.g., the source MAC address or source IP address) and destination address (e.g., the destination MAC address or destination IP address) may be extracted from the packet as the SRC_ADDR and DEST_ADDR respectively. The SRC_ADDR and DEST_ADDR may then be combined using a combining function. Numerous combining functions are available such as XOR or some other logic function or a CRC function applied to the concatenation of the SRC_ADDR and the DEST_ADDR. The modulus of the combined result is then computed based on the number of egress ports available (e.g., N). An example of a static hashing function is shown in Equation 1, although one of ordinary skill in the art would recognize many other possible static hashing functions and/or header fields to utilize.

$$\text{Egress\_Port\_\#} = (\text{SRC\_ADDR XOR DEST\_ADDR}) \bmod N \quad \text{(Eqn. 1)}$$

Statistically over the long haul, static hashing strategies appear to provide suitable load balancing among the egress ports 150a-150n. Under the assumption that flows are equally likely to originate from any source address and be directed to any destination address, Equation 1 will, over the long term provide good load balancing. Unfortunately, this may not be a good assumption as network traffic may concentrate between a particular source address and a particular destination address. This may be further compounded if IP addresses are used in the hashing function as they are typically not assigned as randomly as MAC addresses. Traffic may also not be balanced between any two flows depending on the nature of the data being transmitted over the network. For example, the download of a very large file from a server may create a first flow with considerably more traffic than a second flow containing a short email between two other network nodes. Consequently, at least in the short term, static hashing strategies may create significant imbalances in the loads being handled by the egress ports 150a-150n. This may result in unnecessary congestion along one of the outgoing network links 140a-140n or the unnecessary dropping of packets even though other egress ports 150a-150n and outgoing network links 140a-140n in the LAG 130 have capacity to handle the unbalanced traffic.

Some of the limitations of the static hashing strategies may be alleviated with a dynamic hashing strategy. One simple dynamic hashing strategy is the round robin hashing strategy. In a round robin hashing strategy, flows may be assigned to each of the egress ports 150a-150n in rotation. The first flow may be assigned to the first egress port 150a, the second flow may be assigned to the second egress port 150b, etc. until the Nth flow may be assigned to the Nth egress port 150n. After all N egress ports 150a-150n have been assigned a flow, the process continues when the N+1st flow may be assigned to the first egress port and so on. Like the static hashing strategies, the round robin hashing strategy has good statistical properties over the long haul. However, it may not handle network traffic containing flows having different characteristics and/or QoS attributes as well over the short term. The shortcomings of the round robin hashing strategy may also be alleviated by assigning the egress ports 150a-150n using a different granularity. For example, the round robin assignment may take place at the packet and/or packet segment level, but may result in more complexity in reassembling the flows at a point further along in the network.

The static hashing strategies and the round robin hashing strategy all make hashing decisions based on a limited view of network traffic. Each of the strategies only utilizes flow-based information in making hashing decisions. The static hashing strategies rely on information in the headers contained in the flows and the round robin strategy makes assignments based on the arrival of flows, packets, and/or packet segments at the ingress ports 120a-120m. None of these strategies consider what is taking place on the egress ports 150*a*-150*n*. Some of the shortcomings of the static hashing strategies and the round robin hashing strategies might be alleviated by considering information about the egress ports 150*a*-150*n*.

One possible strategy to include information about the egress ports 150*a*-150*n* is to consider the utilization of the egress ports 150*a*-150*n* in the hashing decision. Utilization is the amount of traffic being handled by a port. An egress port handling more traffic typically has a higher utilization than an egress port handling less traffic. If two egress ports have the same capacity, then the egress port with a higher utilization is using more of its capacity and is less able to handle any new flow that may be assigned to it. By monitoring the amount of traffic handled by each of the egress ports 150*a*-150*n*, as measured by the utilization of each of the egress ports 150*a*-150*n*, it may be possible to identify an egress port with the lowest utilization as the egress port to which the next flow could be assigned. This may alleviate the short-term imbalances caused by flows having different characteristics and/or QoS attributes that are observed when using static hashing strategies and/or the round robin hashing strategy.

Egress port utilization, however, may not provide the most accurate picture of network traffic activity. Network traffic needs both a sender and a receiver. Most networks are configured so that both the sender and the receiver must cooperate in the exchange of flow, packets, and/or packet segments. For example, many networks do not allow a sender to transmit network traffic without limit. Each receiver has finite resources due to outgoing traffic limits, buffer capacity, computing power limits, and the like. Consequently, in many networks supporting full duplex communication, the receiver is able to send flow control information to the sender. In some embodiments, flow control may take the form of simple XOFF and XON messages, where the XOFF message tells the sender to stop transmitting and the XON message tells the sender that transmitting may resume. In some embodiments, flow control may take the form of source quench messages that asks a sender to slow down the amount of network traffic transmitted or to cease transmitting temporarily. For example, the source quench message may be a source quench message of the Internet Control Message Protocol (ICMP). In some embodiments, flow control may take the form of a pause message that asks the sender to stop transmitting for a period of time specified in the pause message. For example, the pause message may be a PAUSE frame supported by various Ethernet protocols. In some embodiments, the pause message may apply only to flows having a specific QoS. For example, the pause message may apply only to flows marked as lossless to guarantee that they are not dropped at the receiver. In some embodiments, the pause message may take the form of a priority flow control pause frame as used in Fibre Channel over Ethernet (FCoE).

Use of flow control information in the hashing strategy may have advantages over egress port utilization. Unlike utilization that only considers how much data is being transmitted over the corresponding egress port, use of flow control information considers the ability of the receiver at the other end of the corresponding outgoing network link 140*a*-140*n* to handle any additional traffic. Relying merely on utilization may be misleading as an egress port that is being constantly paused by flow control may show a very low utilization suggesting that it is able to handle more traffic than the corresponding receiver is prepared to receive. Consequently, having the LAG hashing unit 160 consider flow control information in the hashing strategy would be advantageous.

FIG. 2*a* is a simplified diagram of a windowing strategy for incorporating flow control information in a LAG hashing strategy according to some embodiments. As shown in FIG. 2*a*, a time line 200 may be divided into a series of windows of approximately a same duration. A first window 210 may extend from time $t_0$ to time $t_1$. A second window 220 may extend from time $t_1$ to time $t_2$. A third window 230 may extend from time $t_2$ to time $t_3$. In some embodiments, the time duration between time $t_0$ and time $t_1$, the time duration between time $t_1$ and time $t_2$, and the time duration between time $t_2$ and time $t_3$ may all be approximately the same. In some embodiments, the time duration of the first 210, second 220, and third 230 windows may be as short as 1 µs or shorter. In some embodiments, the time duration of the first 210, second 220, and third 230 windows may be approximately 1 ms. In some embodiments, the time duration of the first 210, second 220, and third 230 windows may be as long as 100 ms or longer, including as long as several seconds.

According to some embodiments, a first number of flow control messages (e.g., XOFF, pause messages, or source quench messages) received at an egress port from a corresponding receiver may be counted during the first window 210. The first number of flow control messages may be used by the LAG hashing unit 160 to determine the relative availability of the egress port to handle a new flow that arrives during the second window 220. In some embodiments, an egress port that receives fewer flow control messages may be better able to handle the new flow. A second number of flow control messages received at the egress port from the corresponding receiver may be counted during the second window 220 and may be used by the LAG hashing unit 160 during the third widow 230. A third number of flow control messages received at the egress port from the corresponding receiver may be counted during the second third 230 and may be used by the LAG hashing unit 160 during a window that begins at $t_3$.

According to some embodiments, a first down time for an egress port may be determined by monitoring flow control messages (e.g., XOFF, XON, pause messages, or source quench messages) received at the egress port from a corresponding receiver during the first window 210. In some embodiments, the first down time may be determined by monitoring the amount of time during the first window 210 for which an XOFF has been received without a following XON. In some embodiments, the first down time may be determined by counting a number of source quench messages received during the first window 210 and assigning a duration for each. In some embodiments, the first down time may be determined by totaling each period of time specified in each pause message received during the first window 210. The first down time may be used by the LAG hashing unit 160 to determine the relative availability of the egress port to handle a new flow that arrives during the second window 220. In some embodiments, an egress port with a smaller first down time may be better able to handle a new flow that arrives during the second window 220. Similar monitoring and computations may be applied during the second window 220, the third window 230, and beyond.

Network traffic may be subject to local fluctuations due to the aperiodic arrival of new flows and/or network conditions both upstream and downstream of the switch 117. According to some embodiments, a history function may be used to reduce fluctuations observed in the flow control metrics (e.g., the various numbers of flow control messages or the various down times). The history function may smooth out the fluctuations by combining flow control metrics from more than one window. In some embodiments, the history function may average the flow control metrics from the most recent two, three, or even more windows. In some embodiments, the history function may apply a non-uniform weighting that places more emphasis on a more recent flow control metric than on a less recent flow control metric. In some embodiments, the history function may use exponential smoothing. If hash_value(i) is the flow control metric to be used during the ith window, then the hash_value(i+1) for use in the i+1st window may be computed from the flow control metric measured during the ith window (FCM(i)) according to Equation 2 where $0 \leq \alpha < 1$. A value of $\alpha = 0$ is equivalent to not using a history function and a value of $\alpha$ near 1 places little emphasis on the most recently measured flow control metric.

$$\text{hash\_value}(i+1) = \alpha * \text{hash\_value}(i) + (1-\alpha) * \text{FCM}(i) \quad \text{(Eqn. 2)}$$

FIG. 2b is a simplified diagram of a windowing strategy for incorporating flow control information in a LAG hashing strategy according to some embodiments. As shown in FIG. 2b, a time line 250 may be divided into a series of sliding windows of approximately the same duration. A fourth window 260 may extend from time $t_4$ to time $t_5$. A fifth window 270 may extend from time $t_6$ to time $t_7$. A sixth window 280 may extend from time $t_8$ to time $t_9$. In some embodiments, the time duration between time $t_4$ and time $t_5$, the time duration between time $t_6$ and time $t_7$, and the time duration between time $t_8$ and time $t_9$ may all be approximately the same. In some embodiments, the time duration of the fourth 260, fifth 270, and sixth 280 windows may be as short as 1 μs or shorter. In some embodiments, the time duration of the fourth 260, fifth 270, and sixth 280 windows may be approximately 1 ms. In some embodiments, the time duration of the fourth 260, fifth 270, and sixth 280 windows may be as long as 100 ms or longer, including as long as several seconds. As shown in FIG. 2b, the use of sliding windows 250, 260, and 270 may provide a more flexible way to compute the flow control metrics (e.g., the various numbers of flow control messages or the various down times for each of the sliding windows). In some embodiments, when the LAG hashing unit 160 requires a new flow control metric at time $t_5$ (e.g., when a new flow arrives), it may determine the flow control metric during the fourth widow 260 by considering the flow control messages received at the corresponding egress port during the last window duration. If a new flow control metric is needed at time $t_7$, the flow control metric may be determined from the fifth widow 270. If a new flow control metric is needed at time $t_9$, the flow control metric may be determined from the sixth widow 280.

According to some embodiments, the flow control metrics may be determined based on QoS attributes. In some embodiments, the flow control messages may be applied only to flows having a specific QoS. In some embodiments, the LAG hashing unit 160 may only consider flow control metrics for the egress ports 150a-150n that support a CoS that is consistent with the corresponding QoS attributes of a flow that is to be assigned to one of the egress ports 150a-150n.

As discussed above and further emphasized here, FIGS. 2a and 2b are merely examples, which should not unduly limit the scope of the claims. One of ordinary skill in the art would recognize many variations, alternatives, and modifications. According to some embodiments, a time duration of each of the first 210, second 220, third 230, fourth 260, fifth 270, and sixth 280 windows may be different. According to some embodiments, a time duration of each of the first 210, second 220, third 230, fourth 260, fifth 270, and sixth 280 windows may become longer or shorter as the LAG hashing unit 160 adapts to variations in network traffic.

According to some embodiments, the LAG hashing unit 160 may consider more than flow control metrics in the LAG hashing strategy. In some embodiments, egress port utilization may be considered by the LAG hashing unit 160. In some embodiments, one or more static LAG hashing strategies may be considered by the LAG hashing unit 160. In some embodiments, the number of flows assigned to each egress port may be considered by the LAG hashing unit. In some embodiments, other metrics may be considered by the LAG hashing unit 160. According to some embodiments, the LAG hashing unit 160 may consider multiple metrics in the LAG hashing strategy. In some embodiments, the LAG hashing unit may consider one or more factors selected from a list consisting of flow control metrics, egress port utilization, static LAG hashing strategies, number of flows assigned to each egress port, and the like. In some embodiments, the LAG hashing unit may assign different weights to the one or more factors selected to be part of the LAG hashing strategy.

FIG. 3a is a simplified diagram of an assignment of flows to egress ports in a LAG at a first time according to some embodiments. As shown in FIG. 3a, a LAG (e.g., the LAG 130) from a network switching unit (e.g., the switch 117) includes three egress ports 0, 1, and 2 (e.g., the egress ports 150a-150n). Although only three egress ports are shown in FIG. 3a, the LAG may have N egress ports. Various flows have been assigned to egress ports 0, 1, and 2, including flows with a lossless QoS and a non-lossless QoS. At the first time shown in FIG. 3a, lossless flow A and non-lossless flows 1 and 2 are assigned to egress port 0 and packets and/or sub-packets from each of those flows is being forwarded for transmission by egress port 0. Lossless flow B and non-lossless flows 3, 4, and 5 are assigned to egress port 1 and lossless flow C and non-lossless flows 6, 7, and 8 are assigned to egress port 2. In accordance with certain embodiments, the network switching unit is monitoring flow control metrics for egress ports 0, 1, and 2. In some embodiments, the flow control metrics may be the numbers of flow control messages received by each egress port 0, 1, and 2 over a time window. In some embodiments, the flow control metrics may be the various down times for each egress port 0, 1, and 2. In some embodiments, separate flow control metrics may be kept for the lossless and non-lossless QoS for each of the egress ports 0, 1, and 2. At the first time shown in FIG. 3a, a new lossless flow D may be directed to the network switching unit for forwarding. In order to hash or assign the lossless flow D to one of the egress ports 0, 1, or 2, the LAG hashing unit (e.g., the LAG hashing unit 160) of the network switching unit may consider the flow control metrics it is monitoring for its egress ports 0, 1, and 2. Based at least on the flow control metrics from the first time, the LAG hashing unit may determine that lossless flow D should be hashed to egress port 0.

FIG. 3b is a simplified diagram of an assignment of flows to egress ports in the LAG at a second time according to some embodiments. As shown in FIG. 3b, the lossless flow D that arrived at the first time has been hashed to egress port 0. At the second time, lossless flows A and D and non-lossless flows 1 and 2 are assigned to egress port 0, lossless flow B and non-lossless flows 3, 4, and 5 are assigned to egress port 1, and lossless flow C and non-lossless flows 6, 7, and 8 are assigned to egress port 2. According to some embodiments, the LAG hashing unit may periodically reevaluate the hashing of flows to the egress ports 0, 1, and 2. For example, during the time interval between the first time and the second time, egress port 0 may have received an increased number of flow control messages and/or seen increased down time. As a result, the LAG hashing unit may observe that the flow control metrics monitored at the second time for egress ports 0, 1, and 2 indicate that it may be advantageous to reassign network traffic from egress port 0 to egress port 2.

FIG. 3c is a simplified diagram of an assignment of flows to egress ports in the LAG at a third time according to some embodiments. As shown in FIG. 3c, based at least in part on the flow control metrics of the second time, the lossless flow D has been reassigned and is now hashed to egress port 2. Thus, at the third time, lossless flow A and non-lossless flows 1 and 2 are assigned to egress port 0, lossless flow B and non-lossless flows 3, 4, and 5 are assigned to egress port 1, and lossless flows C and D and non-lossless flows 6, 7, and 8 are assigned to egress port 2.

Figure 4:
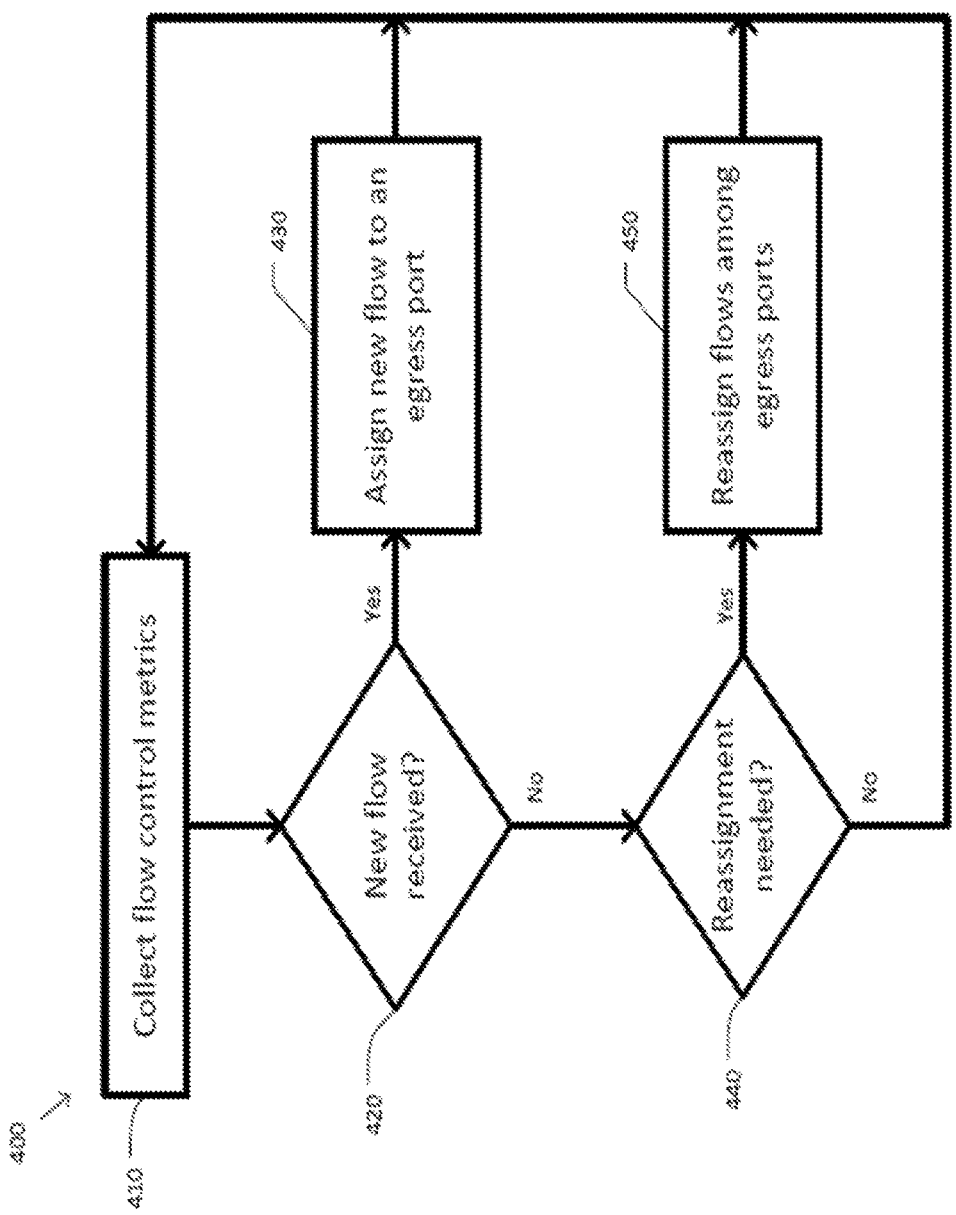
FIG. 4 is a simplified diagram showing a method of hashing flows in a network switching unit according to some embodiments.

FIG. 4 is a simplified diagram showing a method 400 of hashing flows in a network switching unit according to some embodiments. As shown in FIG. 4, the method 400 includes a process 410 for collecting flow control metrics, a process 420 for determining if a new flow has been received, a process 430 for assigning a new flow to an egress port, a process 440 for determining if flows should be reassigned, and a process 450 for reassigning flows among egress ports. According to certain embodiments, the method 400 of hashing flows in a network switching unit can be performed using variations among the processes 410-450 as would be recognized by one of ordinary skill in the art. For example, in some embodiments, one or more of the processes 440 and 450 are optional and may be omitted. In some embodiments, one or more of the processes 410-450 of method 400 may be implemented, at least in part, in the form of executable code stored on non-transient, tangible, machine readable media that when run by one or more processors (e.g., the switch 117 and/or the LAG hashing unit 160) may cause the one or more processors to perform one or more of the processes 410-450.

At the process 410, the network switching unit (e.g., switch 117) collects flow control metrics for egress ports (e.g., the egress ports 150a-150n) assigned to a LAG (e.g., the LAG 130). In some embodiments, the flow control metrics may include numbers of flow control messages received by each of the egress ports in the LAG during a time window. In some embodiments, the flow control metrics may include down times for each of the egress ports in the LAG during a time window. In some embodiments, the time windows may occur at regular intervals. In some embodiments, the time windows may be sliding and include flow control information for only a most recent time window duration. In some embodiments, the flow control metrics may include history information from more than one time window. In some embodiments, the flow control metrics may be collected separately for each QoS supported by each of the egress ports. In some embodiments, the flow control metrics may be used by the network switching unit to determine a particular one of the egress ports that may be best able to support more network traffic. In some embodiments, the network switching unit may include a LAG hashing unit (e.g., LAG hashing unit 160). In some embodiments, the flow control metrics are collected at regular time intervals. In some embodiments, the flow control metrics are collected on an as needed basis.

At the process 420, the network switching unit determines if a new flow has been received. In some embodiments, the new flow may include packets and/or packet segments for network traffic received at an ingress port (e.g., one of the ingress ports 120a-120m) and to be forwarded to one of the egress ports in the LAG. In some embodiments, the new flow includes network traffic from a combination of source and destination nodes not currently being forwarded through the LAG. In some embodiments, the new flow includes QoS attributes. If a new flow has been received at process 420, the method 400 moves to process 430. If a new flow has not been received at process 420, the method 400 moves to process 440.

At the process 430, the network switching unit assigns or hashes the new flow to an egress port. In some embodiments, the new flow may be assigned to the egress port based, at least in part, on the flow control metrics collected in process 410. In some embodiments, the new flow may be assigned to the egress port based, at least in part, on the egress port that has been determined to be the best able to support the new flow. In some embodiments, the new flow may be assigned to the egress port having a best flow control metric from among the collected flow control metrics. In some embodiments, the new flow may be assigned to the egress port based, at least in part, on the QoS attributes of the new flow.

At the optional process 440, the network switching unit determines if any of the flows should be reassigned to different egress ports. In some embodiments, the flow control metrics collected in process 410 may be used to determine if any of the flows should be reassigned. In some embodiments, the determination if any of the flows should be reassigned may be based, at least in part, on whether a first egress port has a first flow control metric that is better than a second flow control metric of a second egress port. In some embodiments, the determination if any of the flows should be reassigned may be based, at least in part, on whether a third egress port has a third flow control metric that has become poorer since the last time process 440 made a determination. In some embodiments, the determination may be made based, at least in part, on a change in a flow control metric that exceeds an absolute threshold. In some embodiments, the determination may be made based, at least in part, on a percentage change in a flow control metric that exceeds a percentage threshold. In some embodiments, the determination may be made based on any suitable heuristic function.

If a reassignment is determined to be needed at process 440, the method 400 moves to process 450. If a reassignment is determined to not be needed at process 440, the method 400 moves back to process 410. In some embodiments, the determination of process 440 occurs at regular time intervals.

At the optional process 450, the network switching unit reassigns flows among the egress ports of the LAG. In some embodiments, a flow may be moved from a first egress port having a poorest flow control metric among the collected flow control metrics to a second egress port having a best flow control metric from among the collected flow control metrics. In some embodiments, more than one flow is reassigned among the egress ports.

Some embodiments of switch 117 and LAG hashing unit 160 include non-transient, tangible, machine readable media that include executable code that when run by one or more processors may cause the one or more processors to perform the processes of method 400 as described above. Some common forms of machine readable media that may include the processes of method 400 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

As discussed above and further emphasized here, FIG. 4 is merely an example, which should not unduly limit the scope of the claims. One of ordinary skill in the art would recognize many variations, alternatives, and modifications. According to some embodiments, the process 410 for collecting flow control metrics occurs only if the process 420 determines that a new flow has been received. In some embodiments, the process 410 occurs between the process 420 and the process 430.

The use of the flow control metrics in the layer-2 routing, forwarding, switching, and/or other traffic-directing decisions, discussed above with regard to determination which of a plurality of aggregated egress ports (e.g., ports belonging to a Link Aggregation Group (LAG)) over which a flow should be directed, has also been found to provide substantial benefits with layer-3 routing, forwarding, switching, and/or other traffic-directing decisions. The embodiments discussed below illustrate how such flow control metrics may also provide benefits when applied to Equal Cost Multi-Path (ECMP) layer-3 routing decisions, Weighted Cost Multi-Path (WCMP) layer-3 routing decisions, layer-3 route/path/link cost determinations, and centralized controller environments that dictate layer-3 routing decisions. However, these specific embodiments are simply provided as examples, and one of skill in the art in possession of the present disclosure will recognize that similar uses of the flow control information discussed herein with other layer-3 traffic-directing decisions will benefit from the teachings of the present disclosure and thus will fall within its scope.

Figure 5:
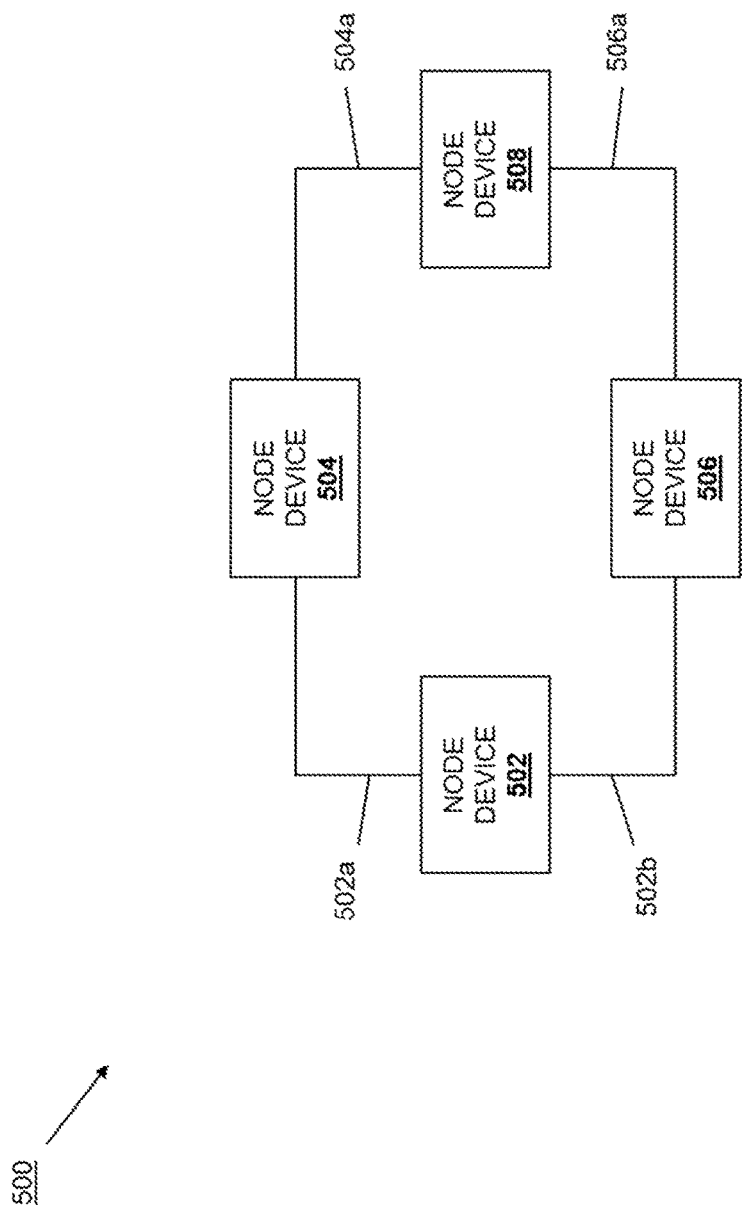
FIG. 5 is a schematic view illustrating an embodiment of a plurality of node devices that are configured to perform layer-3 routing of traffic between each other.

Referring now to FIG. 5, an embodiment of a network 500 is illustrated that is provided as an example of the use of flow control information in ECMP or WCMP layer-3 routing decisions, discussed in further detail below. The network 500 includes a node device 502 that is connected by links 502a to a node device 504, and that is connected by links 502b to a node device 506. The node device 504 is connected by links 504a to a node device 508, and the node device 506 is connected by links 506a to the node device 508. Each of the node devices 502-8 may be the IHS 100 discussed above with reference to FIG. 1, and/or may include some or all of the components of the IHS 100. In specific embodiments, the node devices 502-508 are networking devices such as, for example, switches, routers, and/or other networking devices known in the art. However, other networked node devices are envisioned as falling within the scope of the present disclosure. While only four node devices are illustrated in FIG. 5, any number of node devices are envisioned as falling within the scope of the present disclosure, and one of skill in the art will recognize that the network 500 will typically include many more node devices than are illustrated in FIG. 5.

Figure 6:
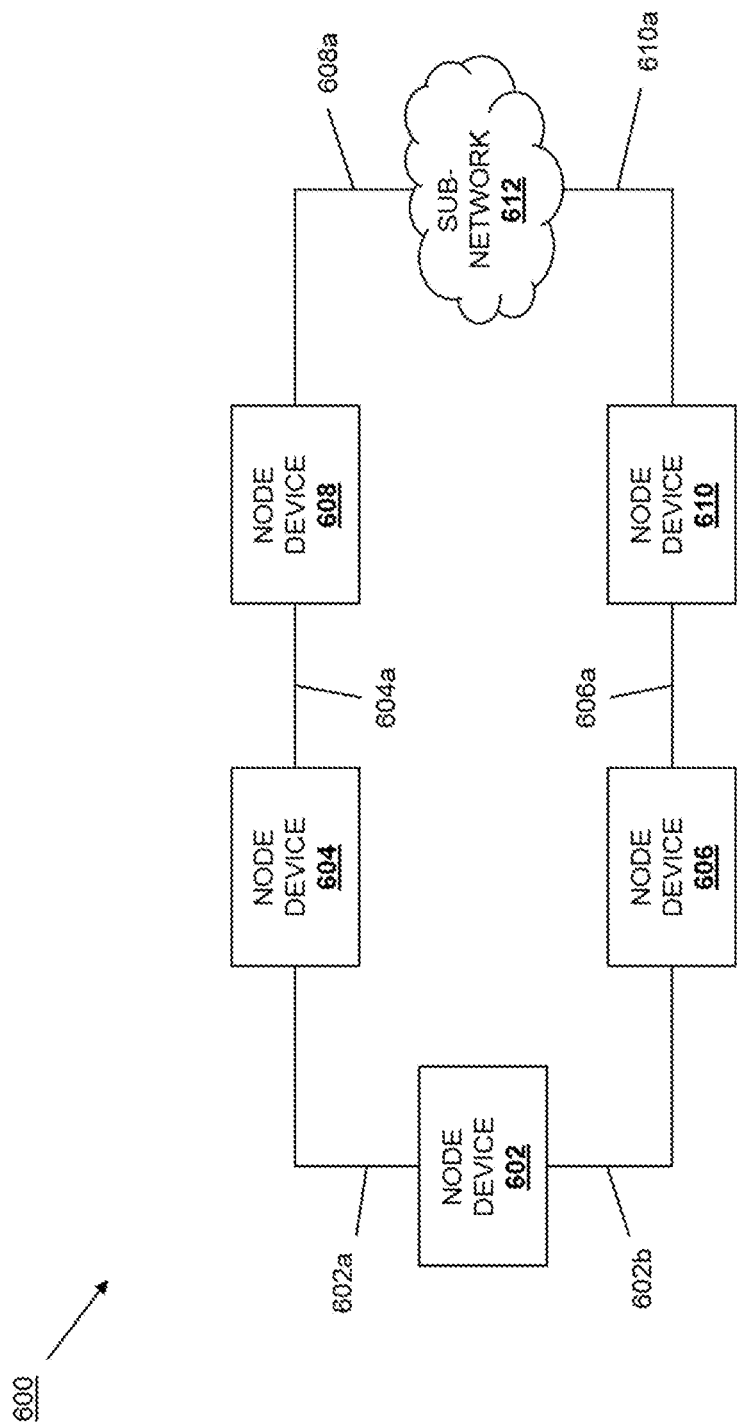
FIG. 6 is a schematic view illustrating an embodiment of a plurality of node devices that are configured to perform layer-3 routing of traffic to and from a network.

Referring now to FIG. 6, an embodiment of a network 600 is illustrated that is provided to describe an example of the use of flow control information in layer-3 route/path/link cost determinations, discussed in further detail below. The network 600 includes a node device 602 that is connected by links 602a to a node device 604, and that is connected by links 602b to a node device 606. The node device 604 is connected by links 604a to a node device 608. The node device 606 is connected by links 606a to a node device 610.

The node device 608 is connected by links 608a to a sub-network 612, and the node device 610 is connected by links 610a to the sub-network 612. The sub-network 612 may include one or more node devices and/or or other computing devices known in the art. Each of the node devices 602-610 may be the IHS 100 discussed above with reference to FIG. 1, and/or may include some or all of the components of the IHS 100. In specific embodiments, the node devices 602-610 are networking devices such as, for example, switches, routers, and/or other networking devices known in the art. However, other networked node devices are envisioned as falling within the scope of the present disclosure. While only six node devices are illustrated in FIG. 6, any number of node devices are envisioned as falling within the scope of the present disclosure, and one of skill in the art will recognize that the network 600 will typically include many more node devices than are illustrated in FIG. 6.

Figure 7:
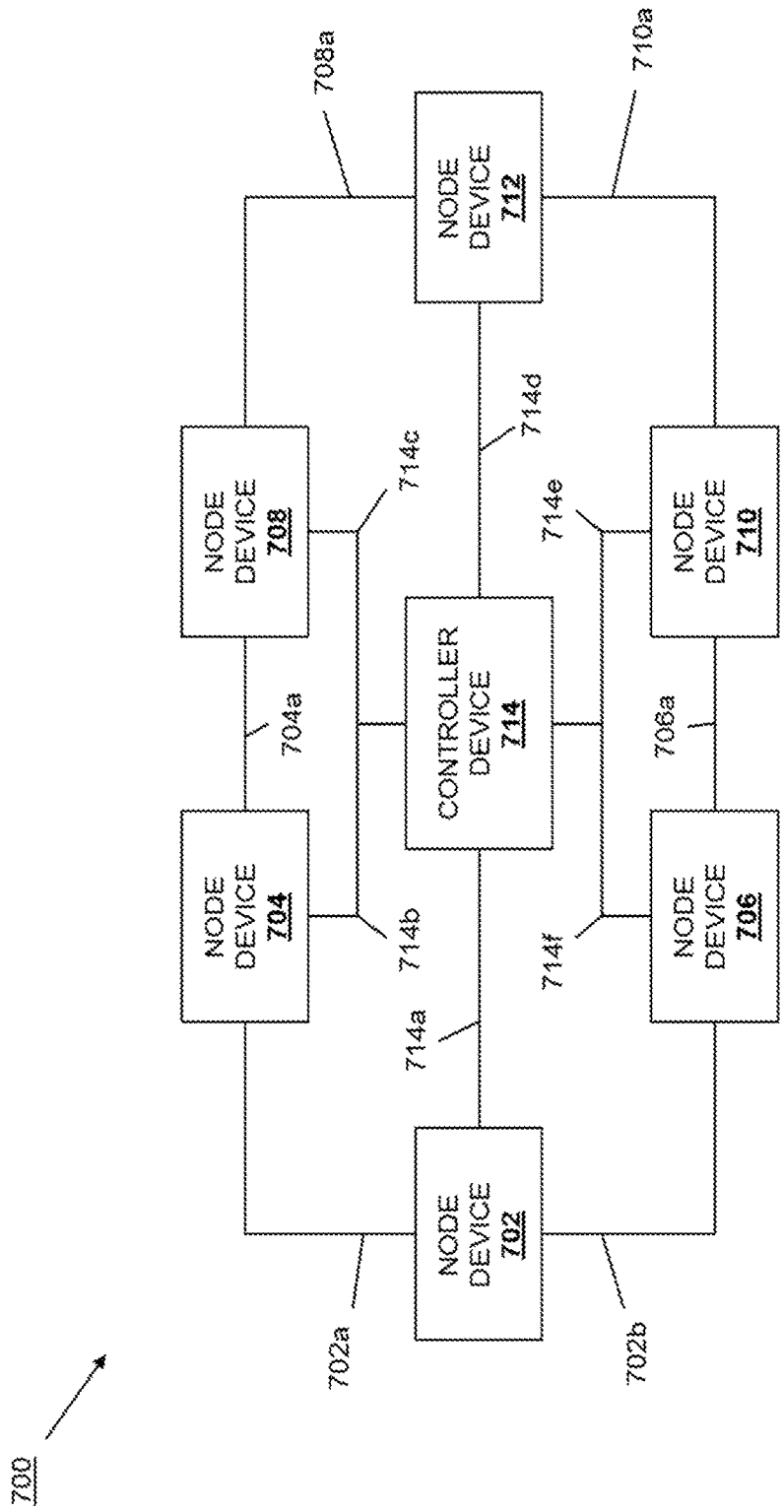
FIG. 7 is a schematic view illustrating an embodiment of a plurality of node devices that are configured to perform layer-3 routing of traffic using information from a controller device.

Referring now to FIG. 7, an embodiment of a network 700 is illustrated that is provided to describe an example of the use of flow control information in centralized controller environments that dictate layer-3 routing decisions, discussed in further detail below. The network 700 includes a node device 702 that is connected by links 702a to a node device 704, and that is connected by links 702b to a node device 706. The node device 704 is connected by links 704a to a node device 708. The node device 706 is connected by links 706a to a node device 710. The node device 708 is connected by links 708a to a node device 712, and the node device 710 is connected by links 710a to the node device 712. Each of the node devices 702-712 may be the IHS 100 discussed above with reference to FIG. 1, and/or may include some or all of the components of the IHS 100. In specific embodiments, the node devices 702-712 are networking devices such as, for example, switches, routers, and/or other networking devices known in the art. However, other networked node devices are envisioned as falling within the scope of the present disclosure. While only six node devices are illustrated in FIG. 7, any number of node devices are envisioned as falling within the scope of the present disclosure, and one of skill in the art will recognize that the network 700 will typically include many more node devices than are illustrated in FIG. 7. A controller device 714 is coupled to each of the node devices 702, 704, 706, 708, 710, and 712 by respective links 714a, 714b, 714c, 714d, 714e, and 714f. The controller device 714 may be the IHS 100 discussed above with reference to FIG. 1, and/or may include some or all of the components of the IHS 100. In specific embodiments, the controller device 714 is a Software Defined Networking (SDN) controller that is configured to perform the centralized information exchange and control discussed below, although other controller devices are envisioned as falling within the scope of the present disclosure.

Figure 8:
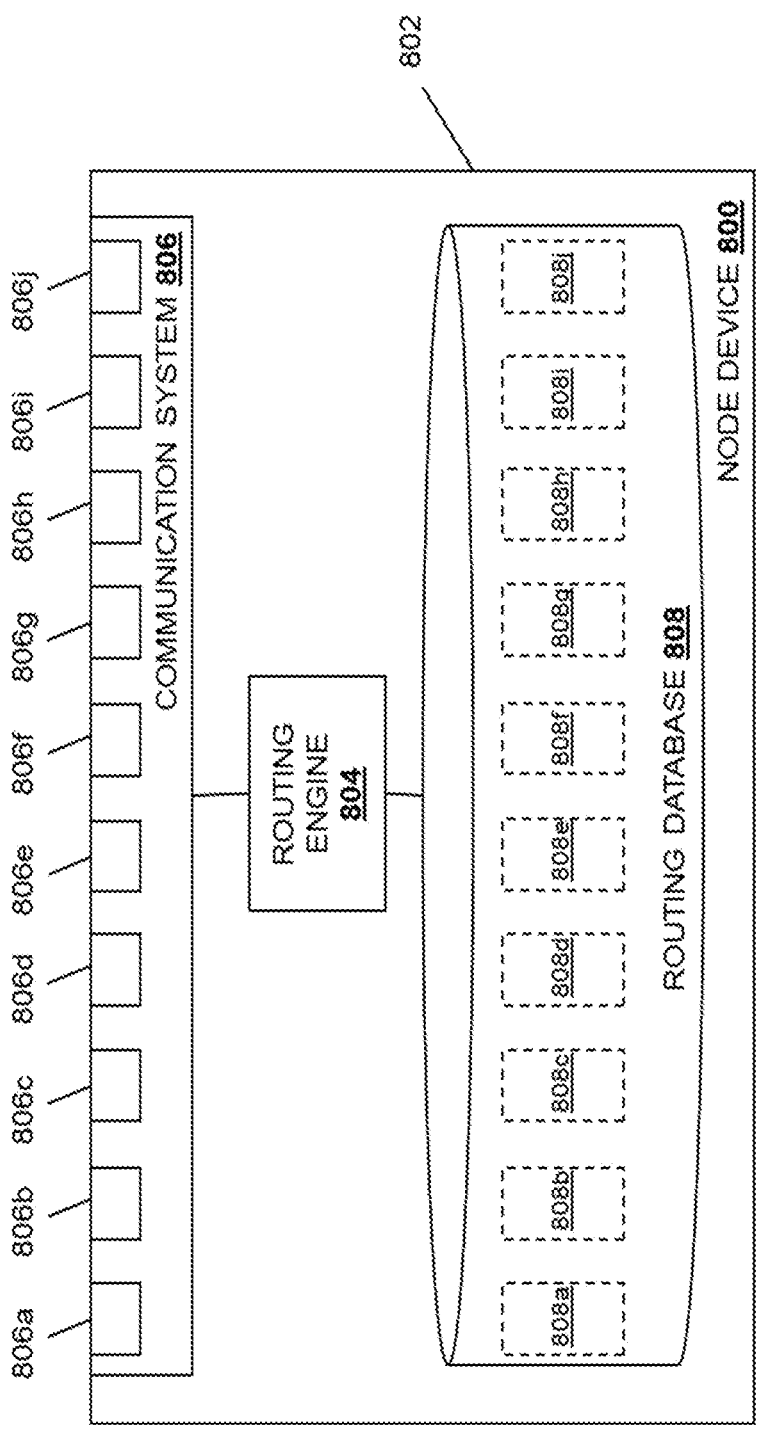
FIG. 8 is a schematic view illustrating an embodiment of a node device used in FIGS. 5, 6, and 7.

Referring now to FIG. 8, an embodiment of a node device 800 is illustrated. The node device 800 may be any of the node devices 502-508 discussed above with reference to FIG. 5, the node devices 602-610 discussed above with reference to FIG. 6, and/or the node devices 702-712 discussed above with reference to FIG. 7. As such, the node device 800 may be the IHS 100 discussed above with reference to FIG. 1 and/or may include some or all of the components of the IHS 100, and in specific embodiments may be a switch, router, and/or other networking device known in the art. However, as discussed above, any of a variety of networked node device are envisioned as falling within the scope of the present disclosure. The node device 800 includes a chassis 802 that houses the components of the node device 800, only some of which are illustrated in FIG. 8. For example, the chassis 802 may house a processing system (not illustrated, but which may include the processor 102 discussed above with reference to FIG. 1) and a memory system (not illustrated, but which may include the memory system 114 discussed above with reference to FIG. 1) that includes instructions that, when executed by the processing system, cause the processing system to provide a routing engine 804 that is configured to perform the functions of the routing engines and node device discussed below. The chassis 802 may also house a communication system 806 that is coupled to the routing engine 804 (e.g., via a coupling between the communication system 806 and the processing system) and that includes a plurality of ports 806a, 806b, and up to 806j that may be any of the ingress ports 120a, 120b, and up to 120m, and/or the egress ports 150a, 150b, and up to 150m, discussed above with reference to FIG. 1.

The chassis 802 may also house a storage system (not illustrated, but which may include the storage device 108 discussed above with reference to FIG. 1) that includes a routing database 806 that is coupled to the routing engine 804 (e.g., via a coupling between the storage system and the processing system) and that is configured to receive and store the information discussed herein that may include traffic information about flows being handled by the node device 800, port utilization information about the utilization of the ports 806-806j, flow control information associated with each of the ports 806a-806j (and in some cases intermediate node device, discussed in further detail below), and/or any of the other traffic information discussed herein. In the specific embodiment illustrated in FIG. 8, the routing database 808 is illustrated as storing the routing information as respective port-specific routing information 808a, 808b, and up to 808j for each of the ports 806a, 806b, and up to 806j (e.g., as traffic queues, traffic flow tracking information, flow control information received at particular ports, etc.), although traffic, routing, flow control, and/or other information received and/or generated by the node device 800 may be stored in any manner while remaining within the scope of the present disclosure. While a specific node device 800 has been illustrated, one of skill in the art will recognize that the node devices of the present disclosure may include a variety of components that have not been illustrated for clarity and that may be used to perform a variety of networking, switching, routing, and/or other functions and/or other actions to enable the functionality discussed below.

Figure 9:
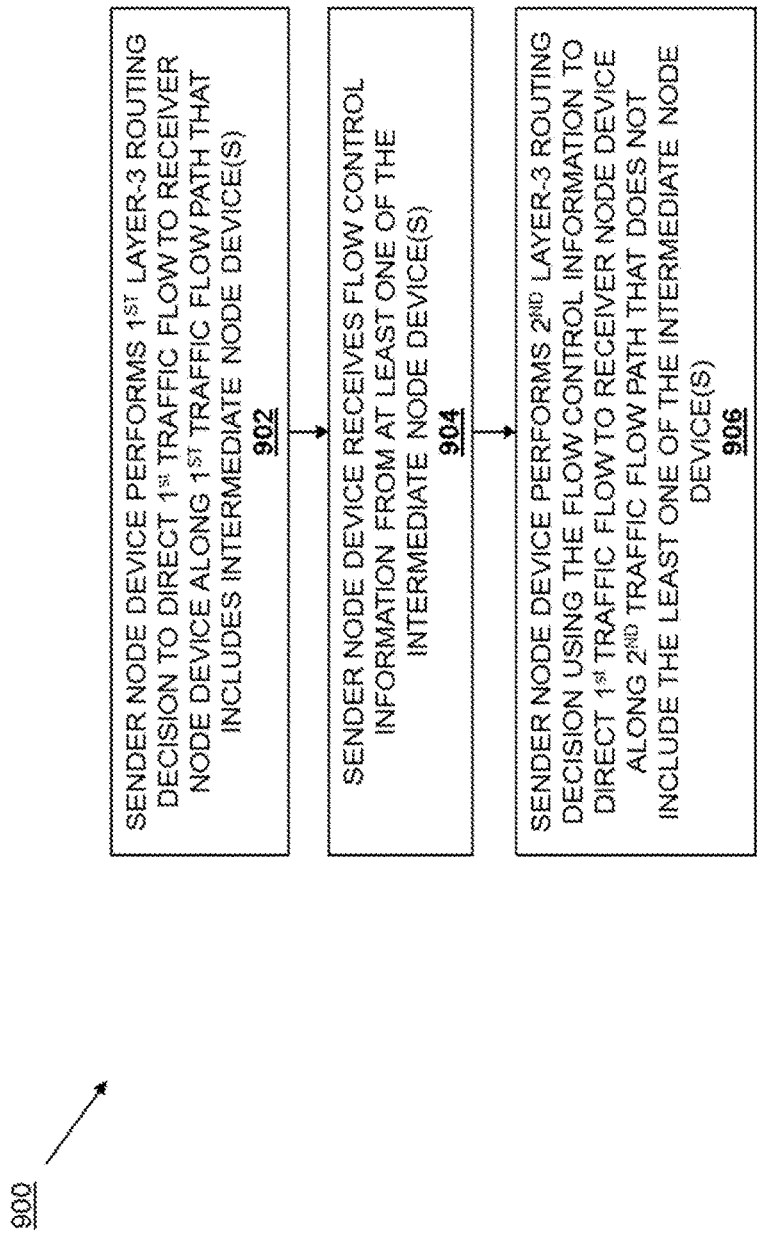
FIG. 9 is a flow chart illustrating a method for layer-3 routing of traffic using flow control information.

Referring now to FIG. 9, an embodiment of a method 900 for the layer-3 routing of traffic using flow control information is illustrated. As described below, the systems and methods of the present disclosure provide for dynamic layer-3 routing of traffic flows by node devices using flow control information received from other node devices, which allows each of the node devices in the network to be globally aware of the congestion states of egress ports, links, and/or other node devices in the network so that they may adjust their layer-3 traffic forwarding paths in a manner that operates to reduce congestion in the network. For example, sender node devices that send and/or forward traffic flows operate to make such layer-3 routing decisions based, at least in part, on flow control information received from intermediate node devices that are located between the sender node device and the receiver node device, with that flow control information indicating that at least one of those intermediate node devices is at or reaching a limit of its ability to transmit traffic. In response, the sender node devices may determine a new traffic flow path that does not include the intermediate node that is at or reaching its ability to transmit traffic, thus operating to dynamically reduce congestion in the network and providing for a more efficient traffic flow through the network. As discussed above, conventional Multi-Protocol Label Switching (MPLS) traffic engineering techniques based on constrained routing protocols may also be used on top the techniques described herein in order to provide traffic engineering functionality based on local policy considerations as well. For example, such conventional MPLS traffic engineering techniques may be employed until flow control information received at the sender node device reaches a threshold, at which time the teachings of the present disclosure may be employed to provide layer-3 routing decisions that utilize that flow control information as discussed below to reduce network congestion.

Figure 10A:
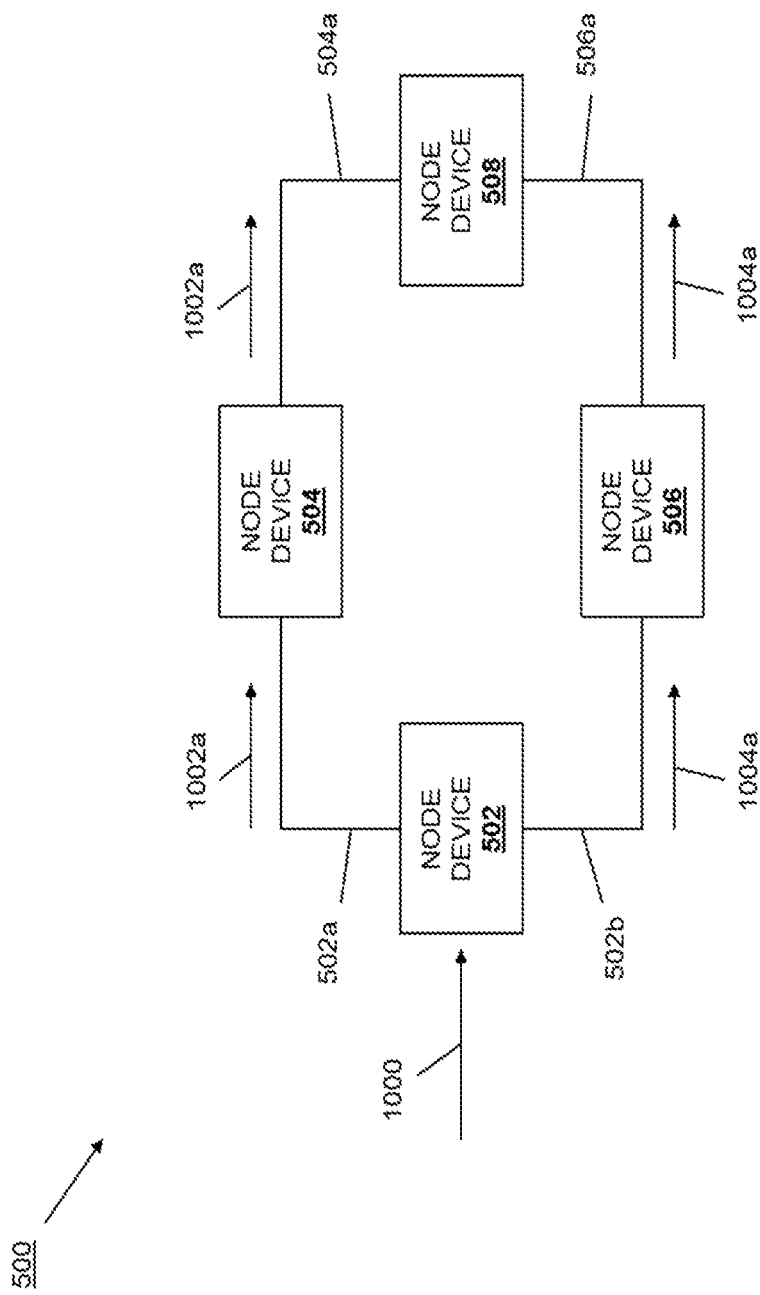
FIG. 10a is a schematic view illustrating a first ECMP layer-3 routing of traffic between the node devices of FIG. 5.

The method 900 begins at block 902 where a sender node device performs a first layer-3 routing decision to direct a first traffic flow to a receiver node device along a first traffic flow path that includes at least one intermediate node device. With reference to FIG. 10a, an embodiment of the use of flow control information in ECMP or WCMP layer-3 routing decisions is illustrated in which the node device 502 is a sender node device 502, the node device 508 is a receiver node device 508, and the node devices 504 and 506 are intermediate node devices 504 and 506. In the illustrated embodiment, the sender node device 502 is receiving a traffic flow 1000 (e.g., via another device in the network 500 such as a server device, a user computing device, another node device, and/or any other traffic flow creating or forwarding device known in the art) that is directed to the receiver node device 508. However, in other embodiments, the traffic flow 1000 that is directed to the receiver node device 508 may be generated at block 902 by the sender node device 502. With reference to FIGS. 8 and 10a, at block 902 the routing engine 804 in the sender node device 502/800 may receive the traffic flow 1000 through one of the ports 806a-806j (i.e., an ingress port as discussed above), or from a subsystem within the sender node device 502/800 (e.g., an application running on the sender node device 502/800) and, in response, perform a first layer-3 routing decision to direct the traffic flow 1000 through different ports 806a-806j (i.e., egress ports as discussed above) and downstream along a first traffic flow path 1002a that travels over at least one of the links 502a to the intermediate node device 504 and over at least one of the links 504a to the receiver node device 508, as well as along a second traffic flow path 1004a that travels over at least one of the link 502b to the intermediate node device 506 and over at least one of the links 506a to the receiver node device 508. As such, each of the intermediate node devices 504 and 506 is configured to receive the traffic flow 1000 that is directed downstream to the receiver node device 508 and transmit that traffic flow downstream to the receiver node device 508.

In a specific example, in FIG. 10a the routing engine 804 in the sender node device 502/800 performs an ECMP layer-3 routing decision at block 902 based on a determination that the first traffic flow path 1002a and the second traffic flow path 1004a have substantially the same cost (e.g., by summing the costs of each of the links in the first traffic flow path 1002a and the second traffic flow path 1004a, or using other ECMP techniques known in the art), which causes the routing engine 804 to load balance the traffic flow 1000 over an ECMP link group (i.e., the link(s) 502a and 502b) such that traffic flow 1000 moves along the first traffic flow path 1002a and the second traffic flow path 1004a as illustrated and described above. In some embodiments, the ECMP layer-3 routing decision at block 902 may be a conventional ECMP layer-3 routing decision that may use the static hashing, dynamic hashing, and/or other techniques described above. Furthermore, one of skill in the art in possession of the present disclosure will recognize how WCMP layer-3 routing decisions may be performed at block 902 in a similar manner while remaining within the scope of the present disclosure. As such, at block 902, the traffic flow 1000 received or generated by the sender node device 502 is directed along the first traffic flow path 1002a and the second traffic flow path 1004a with first traffic flow characteristics that may describe the relative portions of the traffic flow 1000 sent along first traffic flow path 1002a and the second traffic flow path 1004a (e.g., even portions, uneven portions, etc.) and/or any other traffic flow characteristic known in the art.

Figure 11A:
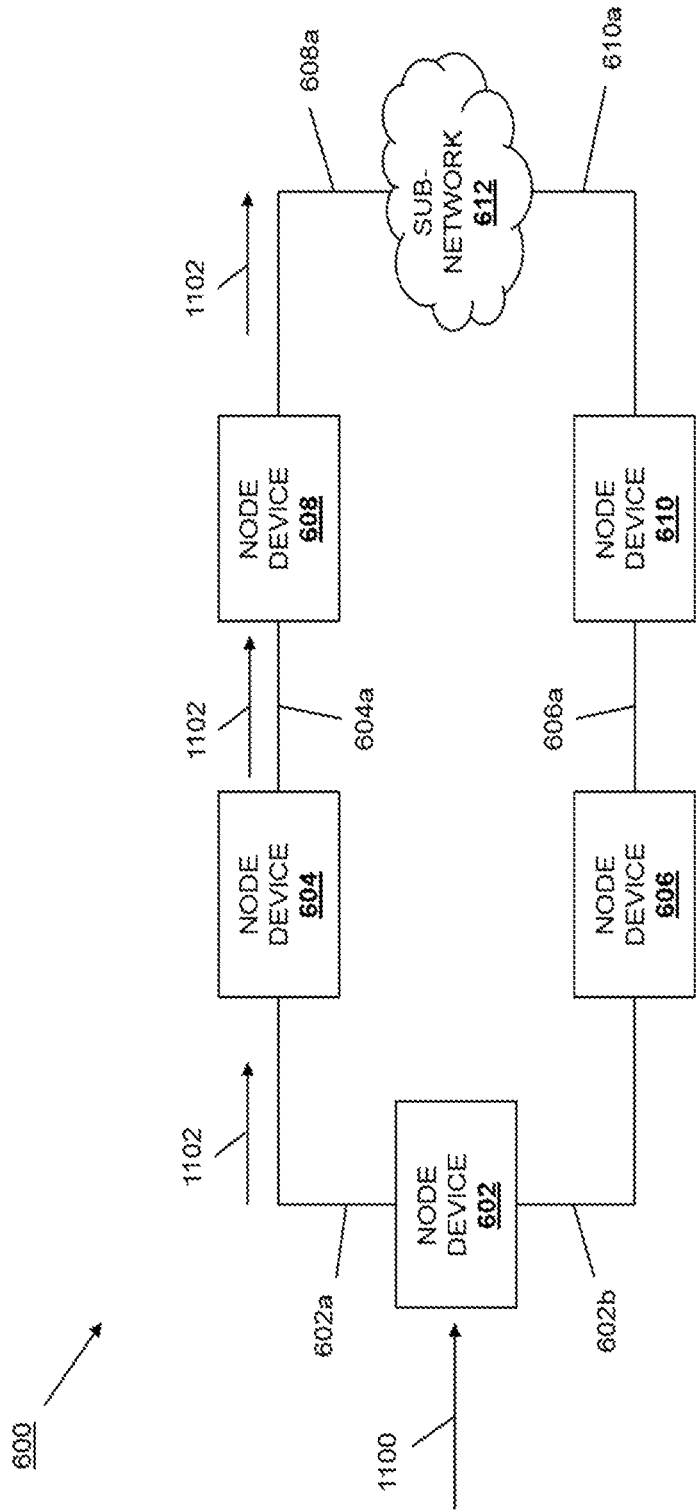
FIG. 11a is a schematic view illustrating a first layer-3 routing of traffic between the node devices of FIG. 6 based on link cost.

With reference to FIG. 11a, an embodiment of the use of flow control information in route/path/link cost determinations is illustrated in which the node device 602 is a sender node device 602, the sub-network 612 is a receiver sub-network 612 that includes at least one receiver node device, and the node devices 604, 606, 608, and 610 are intermediate node devices 604, 606, 608, and 610. In the illustrated embodiment, the sender node device 602 is receiving a traffic flow 1100 (e.g., via another device in the network 600 such as a server device, a user computing device, another node device, and/or any other traffic flow creating or forwarding device known in the art) that is directed to the receiver sub-network 612 (e.g., via a sub-network address such as 160.10.0.0/16). However, in other embodiments, the traffic flow 1100 that is directed to the receiver sub-network 612 may be generated at block 902 by the sender node device 602. With reference to FIGS. 8 and 11a, at block 902 the routing engine 804 in the sender node device 602/800 may receive the traffic flow 1100 through one of the ports 806a-806j (i.e., an ingress port as discussed above), or from a subsystem within the sender node device 602/800 (e.g., an application running on the sender node device 602/800) and, in response, perform a first layer-3 routing decision to direct the traffic flow 1100 through at least one of the ports 806a-806j (i.e., egress ports as discussed above) and downstream along a first traffic flow path 1102 that travels over at least one of the links 602a to the intermediate node device 604, over at least one of the links 604a to the intermediate node device 608, and over at least one the links 608a to the receiver sub-network 612. As such, each of the intermediate node devices 604, 606, 608, and 610 is configured to receive the traffic flow 1100 that is directed downstream to the receiver sub-network 612 and transmit that traffic flow downstream to the receiver sub-network 612.

In a specific example, in FIG. 11a the routing engine 804 in the sender node device 602/800 performs layer-3 route/path/link cost determinations at block 902 that cause the routing engine 804 to associate costs with egress ports, links, and/or intermediate node device such as, for example, a respective cost with each of the intermediate node devices 604 and 606 that are directly connected to the sender node device 602 via link(s) and/or egress ports, and those costs may be stored in the routing database 808. For example, for any of a variety of reasons, the routing engine 804 in the sender node device 602/800 may have assigned a cost of 40 to the intermediate node device 604 (or egress port and/or link(s) coupled to that intermediate node device 604) that is stored in the routing database 808 (e.g., in association with one or more of the ports 806a-j connected to the intermediate node device 604), and a cost of 50 to the intermediate node device 606 (or egress port and/or link(s) coupled to that intermediate node device 606) that is stored in the routing database 808 (e.g., in association with one or more of the ports 806a-j connected to the intermediate node device 606). Subsequently, in response to receiving the traffic flow 1100, the routing engine 804 in the sender node device 602/800 may direct the traffic flow 1100 through the intermediate node device 604 and along the first traffic flow path 1102 (which provides a path to the receiver sub-network 612) due to the cost associated with the intermediate node device 604 being lower than the cost associated with the intermediate node device 606 (which also provides a path to the receiver sub-network 612). In some embodiments, the route/path/link cost determinations at block 902 may be a conventional route/path/link cost determinations that may use conventional cost determination techniques known in the art. As such, at block 902, the traffic flow 1100 received or generated by the sender node device 602 is directed along a first traffic flow path 1102 to the receiver sub-network 612.

Figure 12A:
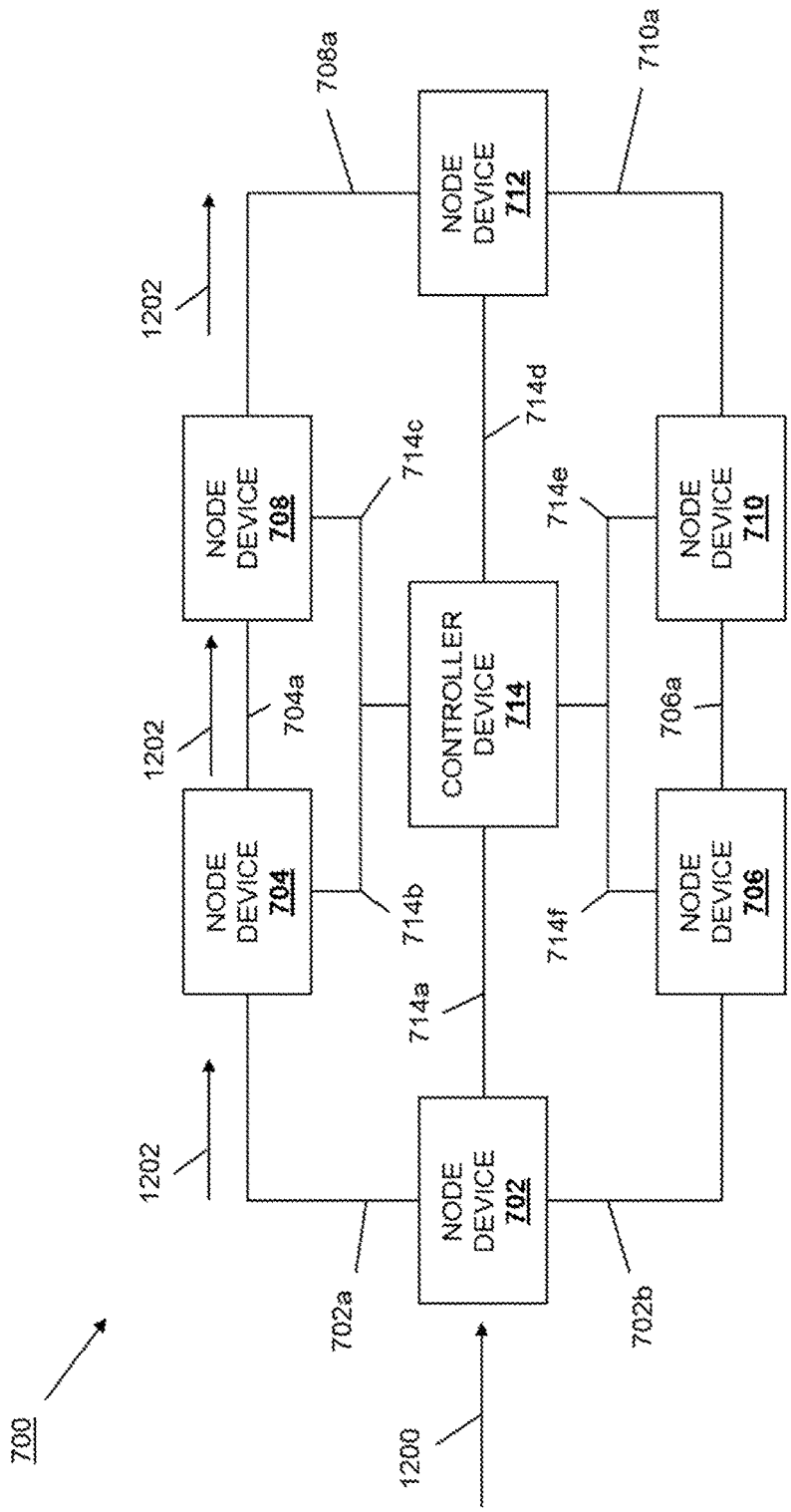
FIG. 12a is a schematic view illustrating a first layer-3 routing of traffic between the node devices of FIG. 7 using information from a controller device.

With reference to FIG. 12a, an embodiment of the use of flow control information in centralized controller environments is illustrated in which the node device 702 is a sender node device 702, the node device 712 is a receiver node device 712, and the node devices 704, 706, 708, and 710 are intermediate node devices 704, 706, 708, and 710. In the illustrated embodiment, the sender node device 702 is receiving a traffic flow 1200 (e.g., via another device in the network 700 such as a server device, a user computing device, another node device, and/or any other traffic flow creating or forwarding device known in the art) that is directed to the receiver node device 712. However, in other embodiments, the traffic flow 1200 that is directed to the receiver node device 712 may be generated at block 902 by the sender node device 702. With reference to FIGS. 8 and 12a, at block 902 the routing engine 804 in the sender node device 702/800 may receive the traffic flow 1200 through one of the ports 806a-806j (i.e., an ingress port as discussed above), or from a subsystem within the sender node device 702/800 (e.g., an application running on the sender node device 702/800) and, in response, perform a first layer-3 routing decision to direct the traffic flow 1200 through at least one of the ports 806a-806j (i.e., egress ports as discussed above) and downstream along a first traffic flow path 1202 that travels over at least one of the links 702a to the intermediate node device 704, over at least one of the links 704a to the intermediate node device 708, and over at least one the links 708a to the receiver node device 712. As such, each of the intermediate node devices 704, 706, 708, and 710 is configured to receive the traffic flow 1200 that is directed downstream to the receiver node device 712 and transmit that traffic flow downstream to the receiver node device 712.

In a specific example, in FIG. 12a, routing engine 804 in the sender node device 702/800 performs a layer-3 routing decision at block 902 based on information received from the controller device 714. For example, the controller device 714 may be an SDN controller that is configured to retrieve/receive information from and provide routing information to each of the node devices 702-712 (e.g., via protocols such as OpenFlow, Simple Network Management Protocol (SNMP), etc.), which provides the SDN controller a global view of the network 700 and allows the SDN controller to push routing information to each of the node devices 702-712 based on, for example, determinations of link quality, link congestion, and/or other traffic effecting factors known in the art. As such, the routing engine 804 in the sender node device 702 may have received routing information from the controller device 714 prior to receiving the traffic flow 1200, and may have stored that routing information in the routing database

808. Subsequently, in response to receiving the traffic flow 1200, the routing engine 804 in the sender node device 702/800 may direct the traffic flow 1200 along the first traffic flow path 1202 based on that routing information. In some embodiments, the layer-3 routing decisions performed using the routing information from the controller device 714 at block 902 may be a conventional layer-3 routing decision. As such, at block 902, the traffic flow 1200 received or generated by the sender node device 702 is directed along a first traffic flow path 1202 to the receiver node device 712. While a few examples of block 902 have been illustrated and described in a variety of different scenarios, one of skill in the art in possession of the present disclosure will recognize that combinations of those examples, as well as modification to any of those examples (or combinations of examples) will fall within the scope of the present disclosure.

Figure 10B:
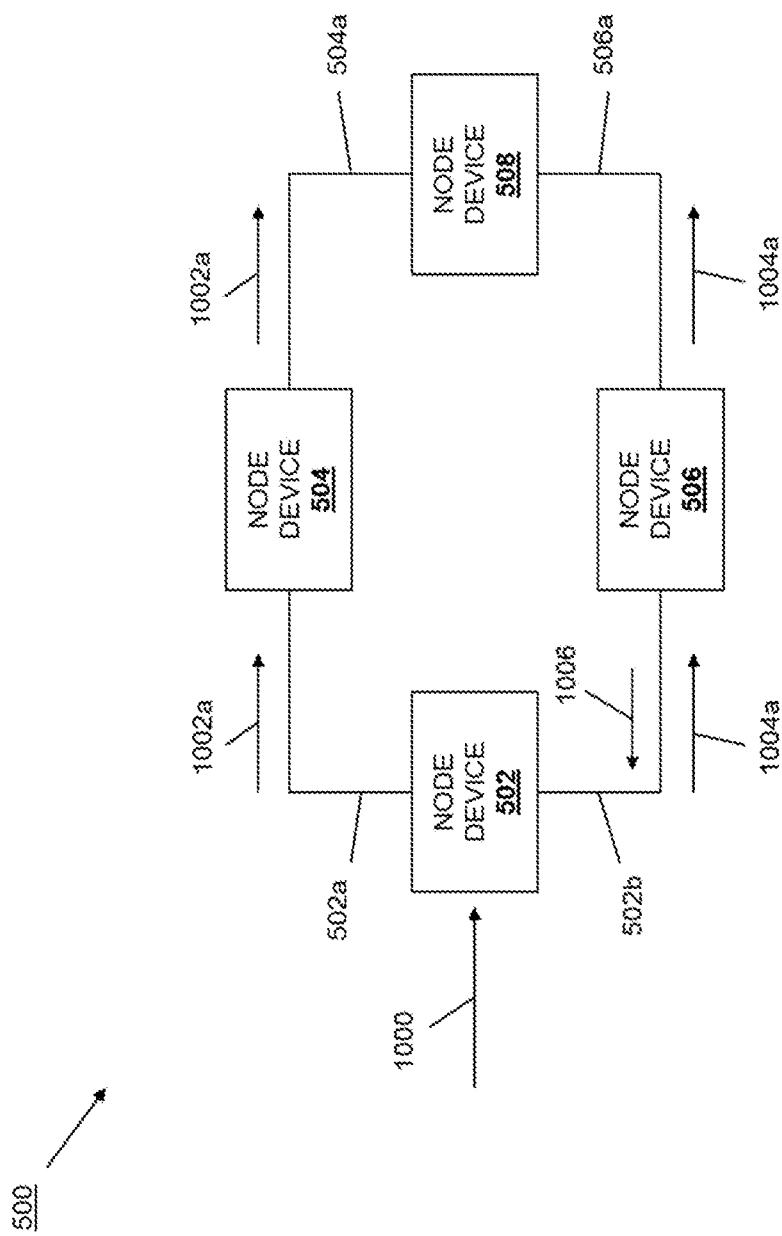
FIG. 10b is a schematic view illustrating an exchange of flow control information between the node devices of FIG. 5.
Figure 11B:
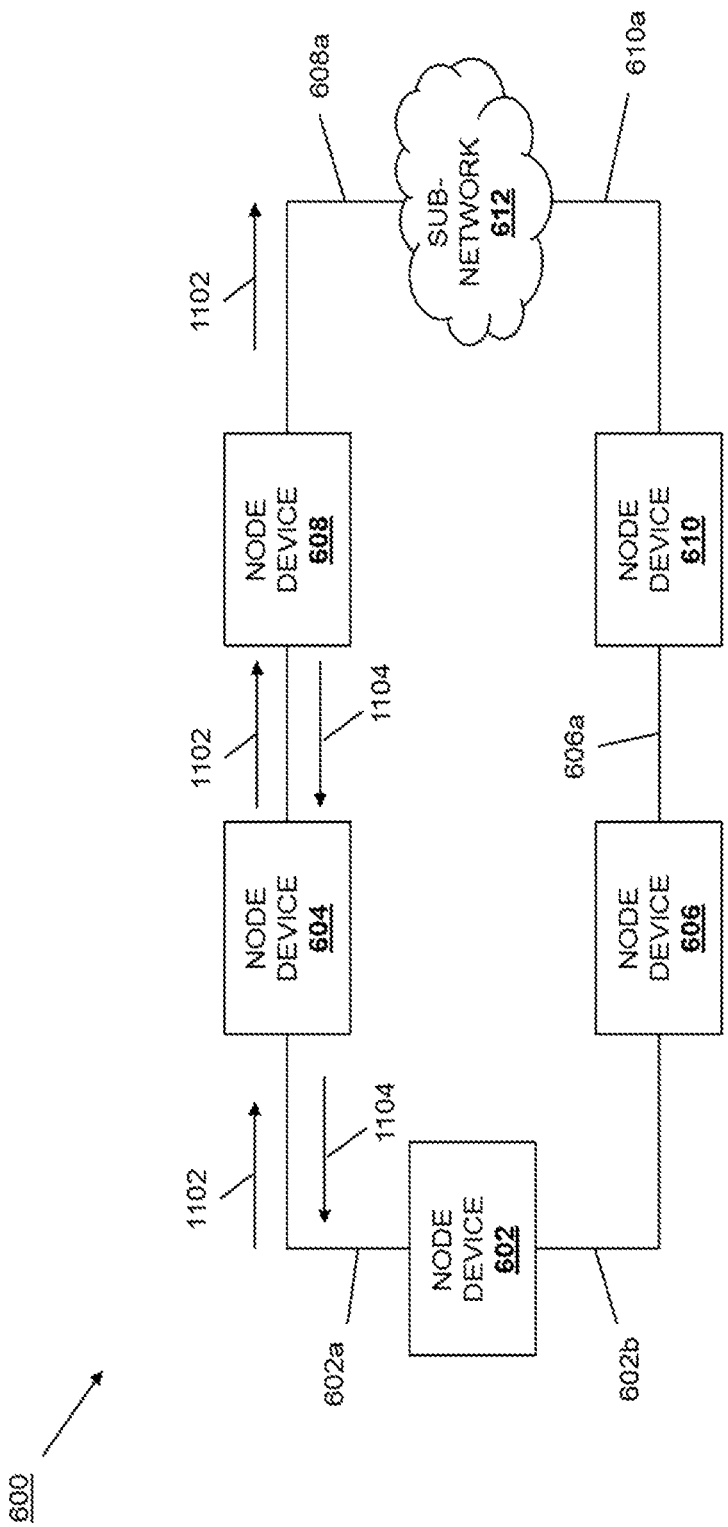
FIG. 11b is a schematic view illustrating an exchange of flow control information between the node devices of FIG. 6.
Figure 12B:
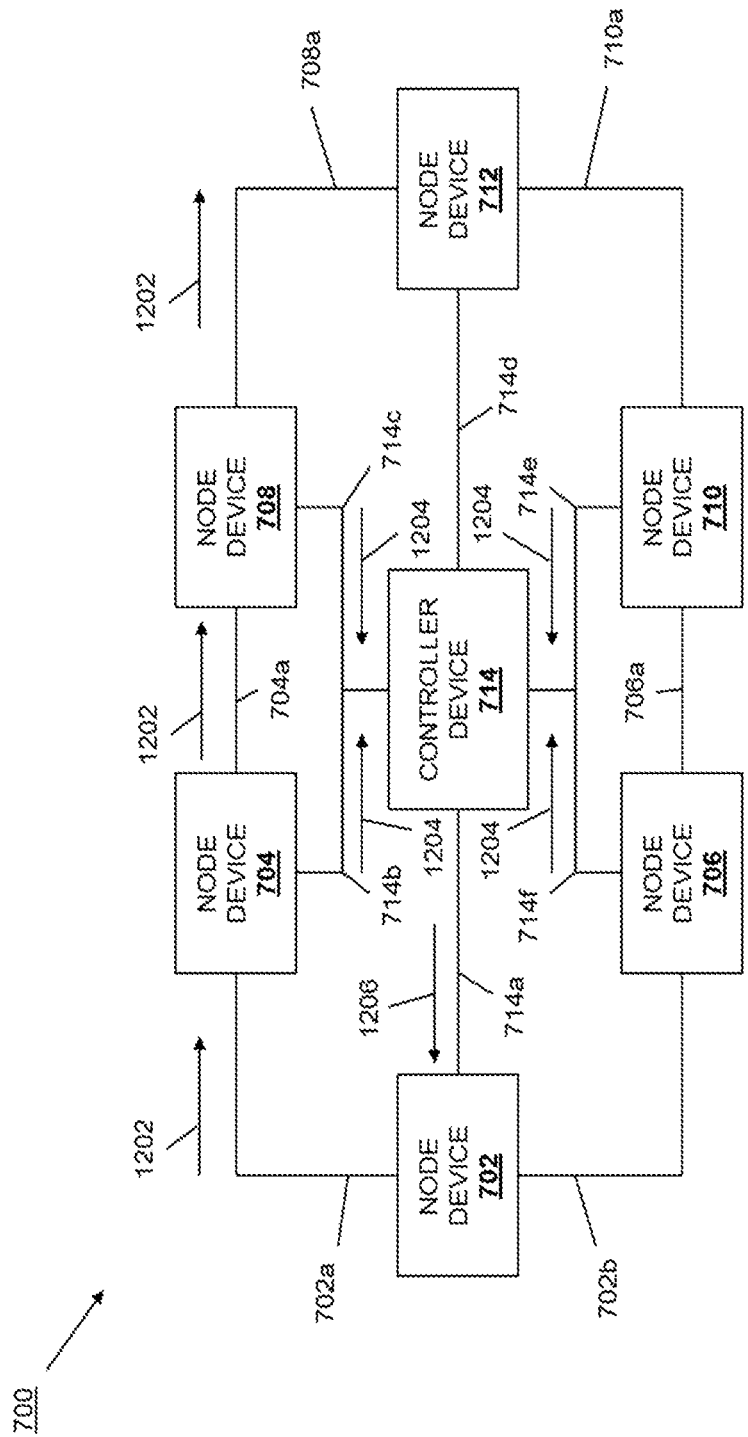
FIG. 12b is a schematic view illustrating an exchange of flow control information between the node devices and the controller device of FIG. 7.

The method 900 then proceeds to block 904 where the sender node device receives flow control information from at least one of the intermediate node devices. As discussed below, the flow control information may be monitored (e.g., by the sender node device, by the controller device, etc.) and, when a flow control metric in that flow control information reaches a threshold within some time interval (e.g., via a history of flow control information that may be tracked on a per-egress port basis), that flow information may be utilized with the layer-3 routing decision to redistribute and/or redirect traffic flows to reduce the loading of a queue in an egress port on the sender node device in order to remedy the traffic issue in the network. In situations with more than one traffic flow directed through an egress port, such redistribution and/or redirection may be based on the traffic flow as well as the flow control information. With reference to FIGS. 8 and 10*b*, in an embodiment of block 904, the routing engine 804 in the intermediate node device 506/800 may transmit flow control information 1006 upstream through at least one of the links 502*b* to the sender node device 502. With reference to FIGS. 8 and 11*b*, in an embodiment of block 904, the routing engine 804 in the intermediate node device 608/800 may transmit flow control information 1104 upstream through at least one of the links 604*a*, the node device 604, and at least one of the links 602*a* to the sender node device 602. With reference to FIGS. 8 and 12*b*, in an embodiment of block 904, the controller device 714 may receive flow control information 1204 from any or all of the intermediate node devices 704, 706, 708, and 710, and may then transmit any or all of the received flow control information 1206 through at least one of the links 714*a* to the sender node device 702.

The flow control information received by the sender node device at block 904 may include any of the flow control information discussed above, and may be collected using any of the techniques described herein. As discussed above, the traffic flows are sent by a sender node device to a receive node device that may cooperate in the exchange of the traffic flow (e.g., packets and/or packet segments), and the network may restrict the traffic flow a sender node device sends based finite resources of the intermediate node device that may be associated with outgoing traffic limits, buffer capacity, computing power limits, and/or other traffic handling limitations known in the art. As such, any or all of the intermediate node devices may be able to send flow control information to the sender node device, which may take the form of XOFF and XON messages (where the XOFF message tells the sender node device to stop transmitting and the XON message tells the sender node device that transmitting may resume), source quench messages that request sender node devices to temporarily cease or reduce the amount of data traffic transmitted (e.g., an ICMP source quench message), pause messages that ask the sender node device to stop transmitting for a period of time specified in the pause message (e.g., a PAUSE frame supported by various Ethernet protocols), and/or other flow control information known in the art In some embodiments, the flow control information may apply only to traffic flows having a specific QoS (e.g., traffic flows marked as lossless to guarantee that they are not dropped), while in other embodiments, the flow control information may apply to any traffic flow being transmitted by a sender node device.

In addition, the windowing strategy detailed above with reference to FIG. 2*a* may be utilized in incorporating the flow control information in the layer-3 routing decisions discussed below. As discussed above with reference to FIG. 2*a*, the time line 200 may be divided into a series of windows of approximately a same duration—the first window 210 from time t0 to time t1, the second window 220 from time t1 to time t2, and the third window 230 from time t2 to time t3—and a first amount of flow control information (e.g., XOFFs, pause messages, source quench messages, etc.) received at an egress port from an intermediate node device may be counted during the first window 210 and used by the routing engine 804 in the sender node device to determine the relative availability of that egress port to handle a traffic flow that arrives or that is being routed during the second window 220 (e.g., an egress port that receives less flow control information may be better able to handle that traffic flow.) Similarly, a second amount of flow control information received at the egress port from an intermediate node device may be counted during the second window 220 and may be used by the routing engine 804 in the sender node device to determine the relative availability of that egress port to handle a traffic flow that arrives or that is being routed during the third window 230, and a third amount of flow control information received at the egress port from an intermediate node device may be counted during the third window 220 and may be used by the routing engine 804 in the sender node device to determine the relative availability of that egress port to handle a traffic flow that arrives or that is being routed during a time window that begins at t3.

Similarly as discussed above, a first down time for an egress port may be determined by monitoring flow control information (e.g., XOFFs, XONs, pause messages, source quench messages, etc.) received at the egress port from an intermediate node device during the first window 210. For example, the first down time may be determined by monitoring the amount of time during the first window 210 for which an XOFF has been received without a following XON, by counting a number of source quench messages received during the first window 210 and assigning a duration for each, by totaling each period of time specified in each pause message received during the first window 210, and/or using other techniques that would be apparent to one of skill in the art in possession of the present disclosure. That first down time may be used by the routing engine 804 in the sender node device to determine the relative availability of the egress port to handle a new traffic flow that arrives or that is otherwise being handled during the second window 220 (e.g., an egress port with a smaller first down time may be better able to handle traffic flow during the second window 220), and similar monitoring and computations may be applied during the second window 220, the third window 230, and subsequent windows.

Similarly as discussed above, because network traffic may be subject to local fluctuations due to the aperiodic arrival of new traffic flows and/or network conditions both upstream and downstream of the intermediate node devices, the history function detailed above may be used to reduce fluctuations observed in the flow control information (e.g., the various amount of flow control information, the varying down times, etc.) by combining flow control information from more than one window to smooth out those fluctuations. For example, the history function discussed above may average the flow control information from the most recent two, three, or more windows, apply a non-uniform weighting that places more emphasis on a more recent flow control information over less recent flow control information, use the exponential smoothing described above, and/or utilize other fluctuation reducing techniques known in the art.

Similarly, the windowing strategy illustrated in FIG. 2b may be utilized to incorporate the flow control information in the layer-3 routing decisions discussed below. As shown in FIG. 2b, the time line 250 may be divided into a series of sliding windows of approximately the same duration, including a fourth window 260 extending from time t4 to time t5, a fifth window 270 extending from time t6 to time t7, and a sixth window 280 extending from time t8 to time t9. As discussed above, the use of sliding windows 250, 260, and 270 may provide a more flexible way to utilize the flow control information (e.g., the various numbers of flow control messages or the various down times for each of the sliding windows), and when the routing engine 804 in the sender node device requires flow control information at time t5 (e.g., when a new traffic flow arrives), it may use the flow control information received during the fourth widow 260 by considering the flow control messages received at the corresponding egress port during the last window duration (e.g., if new flow control information is needed at time t7, the flow control information received during the fifth widow 270 may be used, if new flow control information is needed at time t9, the flow control information received during the sixth widow 280 may be used, and so on.)

Similarly as discussed above, the flow control information may be determined based on QoS attributes, and may be applied only to traffic flows requiring a specific QoS. For example, the sender node device may only consider flow control information for its egress ports that support a QoS that is consistent with the required QoS attributes of the traffic flow(s) being transmitted. While specific types and collection techniques for the flow control information have been detailed above, one of skill in the art in possession of the present disclosure will recognize that any type of flow control information may be collected in any manner and received by the sender node device at block 904 while remaining within the scope of the present disclosure.

Figure 10C:
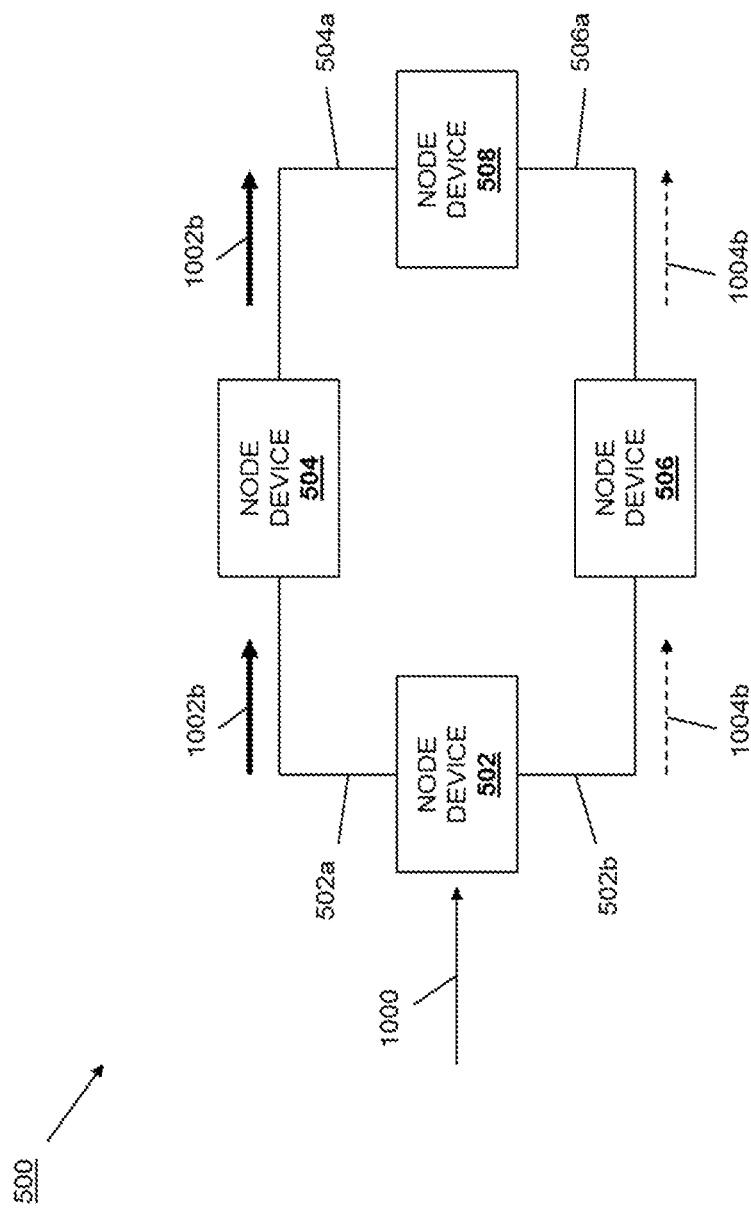
FIG. 10c is a schematic view illustrating a second ECMP layer-3 routing of traffic between the node devices of FIG. 5 based on the flow control information exchanged in FIG. 10b.

The method 900 then proceeds to block 906 where the sender node device performs a second layer-3 routing decision using the flow control information to direct the first traffic flow to the receiver node device along a second traffic flow path that does not include the at least one intermediate node device that provided the flow control information at block 904. With reference to FIGS. 8 and 10c, at block 906 the routing engine 804 in the sender node device 502/800 may have received the flow control information 1006 from the node device 506 and, in response to a flow control metric in the flow control information reaching a threshold, performed a second layer-3 routing decision using the flow control information 1006 in order to redistribute how the traffic flow 1000 is transmitted through the different ports 806a-806j (i.e., egress ports as discussed above) and downstream along a third traffic flow path 1002b and a fourth traffic flow path 1004b that are similar to the first traffic flow path 1002a and the second traffic flow path 1004a discussed above in that the third traffic flow path 1002b travels over at least one of the links 502a to the intermediate node device 504 and over at least one of the links 504a to the receiver node device 508, and the fourth traffic flow path 1004b travels over at least one of the link 502b to the intermediate node device 506 and over at least one of the links 506a to the receiver node device 508, but different in that the amount of the traffic flow 1000 provided over the third traffic flow path 1002b has increased relative to the first traffic flow path 1002a (as indicated by the bold arrow) and the amount of the traffic flow 1000 provided over the fourth traffic flow path 1004b has decreased relative to the second traffic flow path 1004a (as indicated by the dashed arrow). As such, the sender node device 502 is configured to utilized the flow control information from intermediate node device(s) in a layer-3 routing decision in order to change one or more traffic flow paths by redistributing a traffic flow (e.g., chaing the amount of traffic flow provided over particular traffic flow paths) to reduce the traffic load provided to an intermediate node device that has reported traffic flow transmittal issues via flow control information. As discussed above, the layer-3 routing decision that utilizes the flow control information at block 906 may be an ECMP routing decision, a WCMP routing decision, and/or other layer-3 routing decisions known in the art.

Figure 11C:
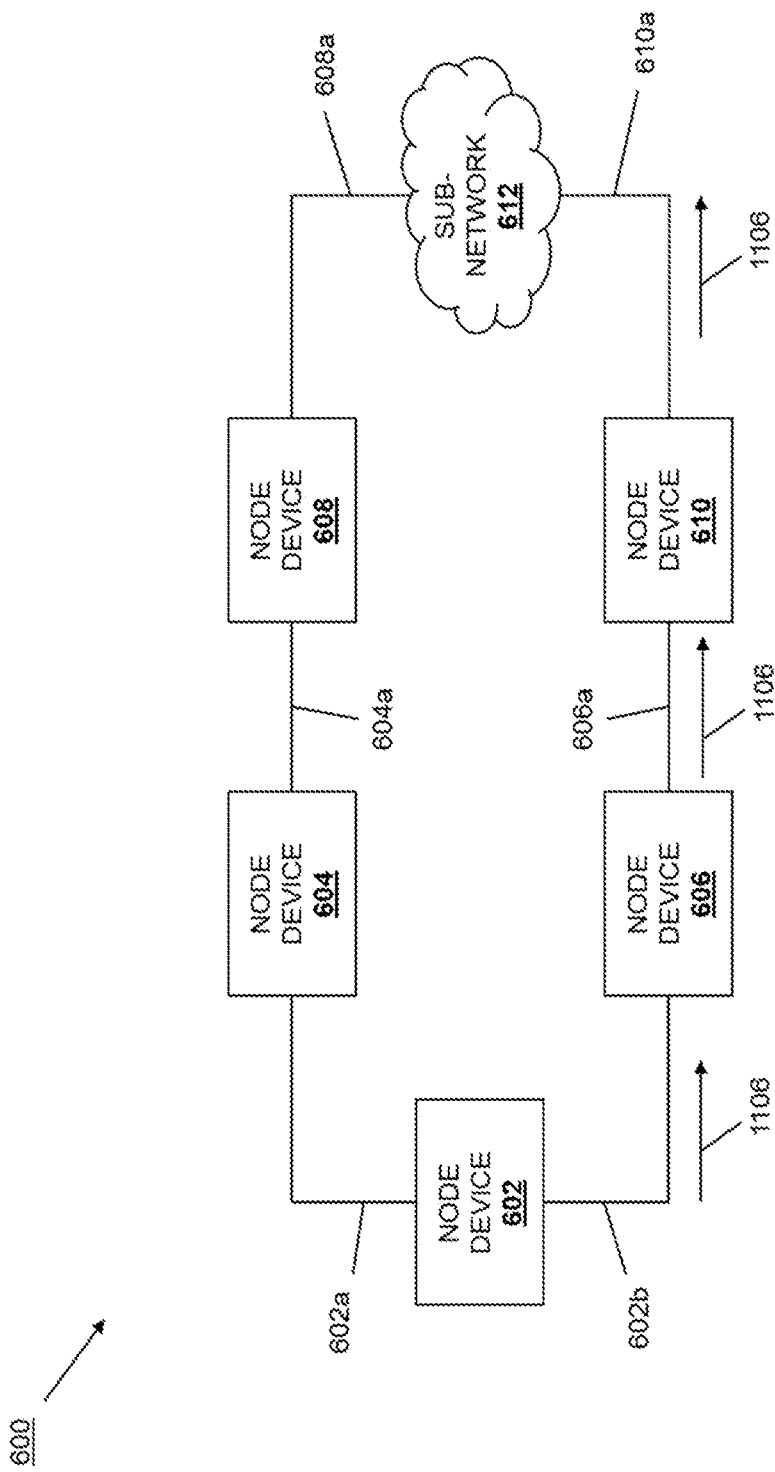
FIG. 11c is a schematic view illustrating a second layer-3 routing of traffic between the node devices of FIG. 6 based on modified link cost using the flow control information exchanged in FIG. 10b.

With reference to FIGS. 8 and 11c, at block 906 the routing engine 804 in the sender node device 602/800 may have, in response to the received flow control information reaching a threshold, performed a second layer-3 routing decision using the received flow control information that includes making a layer-3 route/path/link cost determination that modifies the costs associated with one or more intermediate node devices (or links/egress ports coupled to the intermediate node device(s)). For example, in response to receiving the flow control information from the node device 608, the routing engine 804 in the sender node device 602/800 may have modified a cost associated with the intermediate node device 604 (or link 602a/egress port connected to that intermediate node device 604) in the routing database 808 from 40 to 70. As discussed above, the intermediate node device 606 (or link 602b/egress port connected to that intermediate node device 606) may have been previously associated with a cost of 50 in the routing database 808. Subsequently, the routing engine 804 in the sender node device 602/800 may direct the traffic flow 1100 along through the intermediate node device 606 and along a second traffic flow path 1106 based on the cost associated with the intermediate node device 606 (or link 602b/egress port connected to that intermediate node device 606) now being lower than the cost associated with the intermediate node device 604 (or link 602a/egress port connected to that intermediate node device 604). Thus, at block 906, the traffic flow 1100 may be redirected from the first traffic flow path 1102 to the second flow path 1106 to reach the receiver sub-network 612. As such, the sender node device 602 is configured to utilize the flow control information from intermediate node device(s) in a layer-3 routing decision stemming from route/path/link cost determinations in order to change a traffic flow path to reduce the traffic load provided to an intermediate node device that has reported traffic flow transmittal issues via flow control information. Furthermore, subsequent flow control information may be used by the sender node device similarly as describe above to modified the costs associated with intermediate node devices up and/or down depending on the content of that flow control information.

Figure 12C:
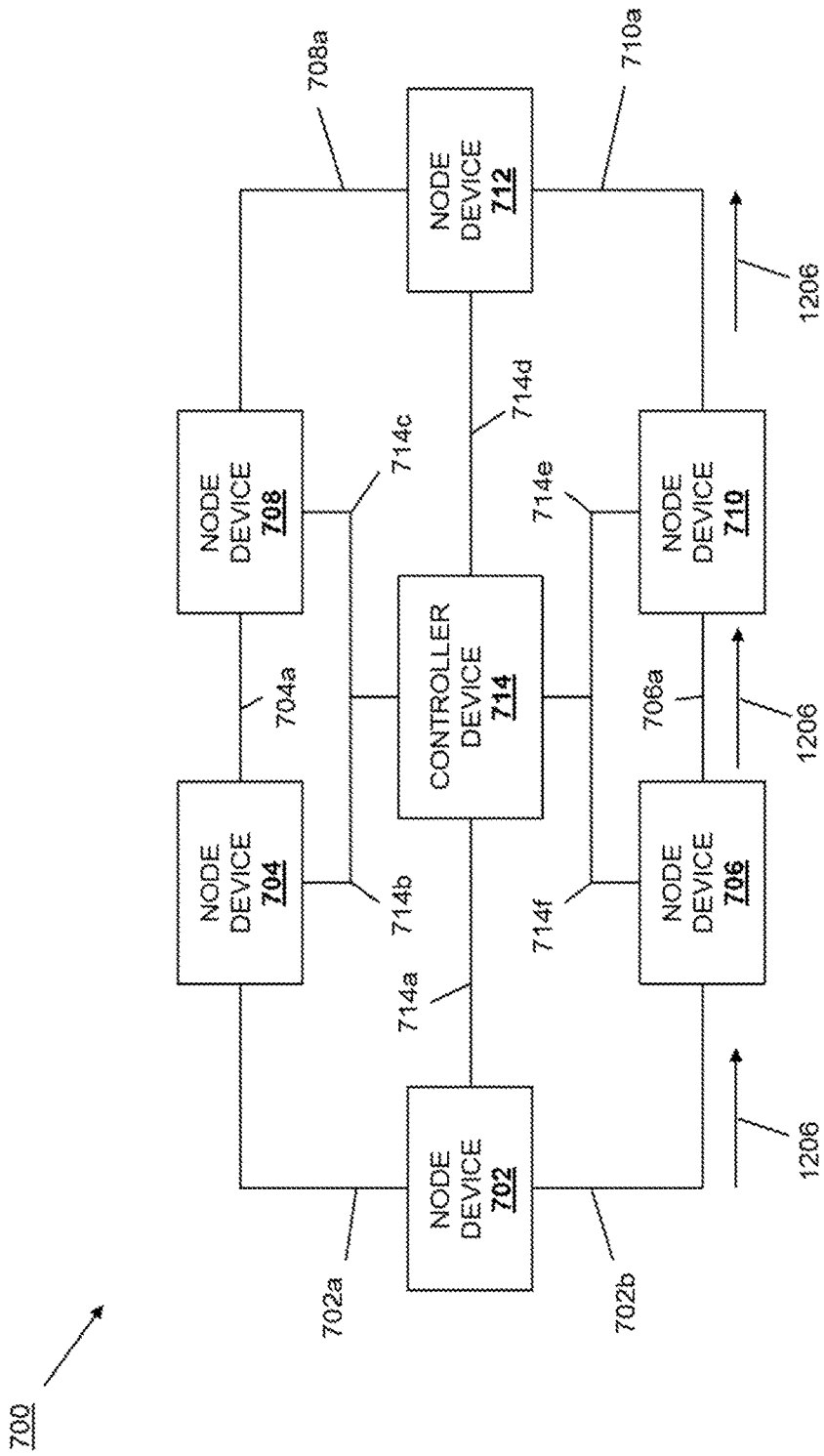
FIG. 12c is a schematic view illustrating a second layer-3 routing of traffic between the node devices of FIG. 7 based on the flow control information exchanged in FIG. 12b.

With reference to FIGS. 8 and 12c, at block 906 the routing engine 804 in the sender node device 702/800 may perform a second layer-3 routing decision based on flow control information (or routing information that is based on flow control information) received from the controller device 714. For example, the routing engine 804 in the sender node device 702 may redirect the traffic flow 1200 along a second traffic flow path 1206 (i.e., through at least one of the links 702b, the intermediate node device 706, at least one of the links 706a, the intermediate node device 710, at least one of the links 710a, and to the receiver node device 712) in response to flow control information provided by at least one of the intermediate node devices 704 and 708 and forwarded by the controller device 714, or in response to routing information determined by the controller device 714 using the flow control information received from at least one of the intermediate node devices 704 and 708. Thus, at block 906, the traffic flow 1200 may be redirected from the first traffic flow path 1202 to the second flow path 1206 to reach the receiver node device 712. As such, the sender node device 702 is configured to communicate with a controller device 714 to utilize flow control information from intermediate node device(s), or routing information derived by the controller device 714 from flow control information provided from intermediate node device(s), in a layer-3 routing decision in order to change a traffic flow path to reduce the traffic load provided to an intermediate node device that has reported traffic flow transmittal issues via flow control information. In specific examples, the controller device 714 may monitor multiple parameters of a traffic flow path (e.g., frequency of pause frames in flow control information, transmit throughput, number of flow assigned to each link in an ECMP group) and make determinations of link quality based on these factors as well as heuristic functions of these factors that assign different weights to each factor and that may act on particular ranges of threshold values for each factor. In some embodiments, this may include polling the factors periodically to determine the "best" or most efficient link for assigning a new traffic flow or redistributing at least a portion of a currently-handled traffic flow.

With reference back to FIGS. 3a, 3b, and 3c and the associated discussion, the distribution of traffic flows on egress ports in any of the sender node devices 502, 602, and 702 may be modified based on the flow control information and layer-3 routing decisions in substantially the same manner discussed above (e.g., to add a new lossless flow D to egress port 0 at a first time, and then move that lossless flow D from egress port 0 to egress port 2 at a second time), and one of skill in the art in possession of the present disclosure will recognize how the systems and methods discussed above may provide benefits in a variety of other network scenarios known in the art. Thus, systems and methods have been described that provide for the use by a sender node device of flow control information from one or more intermediate node devices in layer-3 routing decisions that results in the redistribution or redirection of traffic flows through a network in order to reduce the traffic load on any intermediate node device in the network that reports traffic issues, and provides for a more efficient flow of traffic flows through the network.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A flow control information routing system, comprising:
a receiver node device;
a plurality of intermediate node devices that are coupled to the receiver node device and that are configured to:
  receive at least one traffic flow that is directed downstream;
  transmit the at least one traffic flow downstream; and
  provide flow control information upstream that is based on the at least one traffic flow transmitted downstream; and
a sender node device that includes a plurality of egress ports that are coupled to the receiver node device through the plurality of intermediate node devices, wherein the sender node device is configured to:
  perform a first layer 3 routing decision to direct a first traffic flow to the receiver node device through a first egress port of the plurality of egress ports and along a first traffic flow path that includes at least one first intermediate node device of the plurality of intermediate node devices;
  receive first flow control information that is provided by the at least one first intermediate node device;
  receive second flow control information that is provided by at least one second intermediate node device of the plurality of intermediate node devices that is coupled to a second egress port of the plurality of egress ports; and
  perform a second layer 3 routing decision, in response to the first flow control information from the at least one first intermediate node device and the second flow control information from the at least one second intermediate node device indicating that a second traffic flow path through the second egress port has a lower down time during a first time period than the first traffic flow path during the first time period, in order to direct the first traffic flow to the receiver node device through the second egress port along the second traffic flow path that includes the at least one second intermediate node device and that does not include the at least one first intermediate node device.

2. The system of claim 1, wherein the first layer 3 routing decision and the second layer 3 routing decision are Equal Cost Multi-Path (ECMP) routing decisions.

3. The system of claim 1, wherein the first layer 3 routing decision is based on at least one first cost assigned to the at least one first intermediate node device, and wherein the at least one first cost assigned to the at least one first intermediate node device is modified based on the first flow control information to at least one second cost assigned to the at least one first intermediate node device that is greater than a third cost assigned to the at least one second intermediate node device based on the second flow control information.

4. The system of claim 1, wherein the first flow control information is provided directly from the at least one first intermediate node device to the sender node device and the second flow control information is provided directly form the at least one second intermediate node device to the sender node device.

5. The system of claim 1, further comprising:
a controller device coupled to each of the receiver node device, the plurality of intermediate node devices, and the sender node device, wherein the controller device is configured to:
receive the first flow control information from the at least one first intermediate node device;
receive the second flow control information from the at least one second intermediate node device; and
provide the first flow control information from the at least one first intermediate node device and the second flow control Information from the at least one second intermediate node device to the sender node device.

6. The system of claim 1, wherein the first flow control information and the second flow control information include at least one pause frame.

7. An Information Handling System (IHS), comprising:
a communication system that includes a plurality of egress ports;
a non-transitory memory system; and
a processing system that is coupled to the communication system and the non-transitory memory system, wherein the processing system is configured to read instructions from the non-transitory memory system to provide a routing engine that is configured to:
perform a first layer 3 routing decision to direct a first traffic flow through a first egress port of the plurality of egress ports in the communication system to a receiver node device along a first traffic flow path that includes at least one first intermediate node device;
receive, through the communication system, first flow control information that is provided by the at least one first intermediate node device;
receive, through the communication system, second flow control information that is provided by at least one second intermediate node device that is coupled to a second egress port on the communication system; and
perform a second layer 3 routing decision, in response to the first flow control information from the at least one first intermediate node device and the second flow control information from the at least one second intermediate node device indicating that a second traffic flow path through the second egress port has a lower down time during a first time period than the first traffic flow path during the first time period, in order to direct the first traffic flow through the second egress port of the communication system to the receiver node device along the second traffic flow path that includes the at least one second intermediate node device and that does not include the at least one first intermediate node device.

8. The IHS of claim 7, wherein the first layer 3 routing decision and the second layer 3 routing decision are Equal Cost Multi-Path (ECMP) routing decisions.

9. The IHS of claim 7, wherein the first layer 3 routing decision is based on at least one first cost assigned to the at least one first intermediate node device, and wherein the at least one first cost assigned to the at least one first intermediate node device is modified based on the first flow control information to at least one second cost assigned to the at least one first intermediate node device that is greater than a third cost assigned to the at least one second intermediate node device based on the second flow control information.

10. The IHS of claim 7, wherein the first flow control information is received directly from the at least one first intermediate node device and the second flow control information is received directly form the at least one second intermediate node device.

11. The IHS of claim 7, wherein the first flow control information provided by the at least one first intermediate node device and the second flow control information provided by the at least one second intermediate node device is received from a controller device.

12. The IHS of claim 7, wherein the first flow control information and the second flow control information includes at least one pause frame.

13. The IHS of claim 12, wherein the first flow control information includes a plurality of pause frames received over at least one time period and the second flow control information includes a plurality of pause frames received over the at least one time period.

14. A method for routing traffic using flow control information, comprising:
performing, by a sender node device, a first layer 3 routing decision to direct g first traffic flow to a receiver node device through a first egress port on the sender node device and along a first traffic flow path that includes at least one first intermediate node device;
receiving, by the sender node device from the at least one first intermediate node device, first flow control information;
receiving, by the sender node device from at least one second intermediate node device coupled to a second egress port on the sender node device, second flow control Information; and
performing, by the sender node device, a second layer 3 routing decision, in response to the first flow control information from the at least one first intermediate node device and the second flow control information from the at least one second intermediate node device indicating that a second traffic flow path through the second egress port has a lower down time during a first time period than the first traffic flow path during the first time period, in order to direct the first traffic flow to the receiver node device along the second traffic flow path that includes the at least one second intermediate node device and that does not include the at least one first intermediate node device.

15. The method of claim 14, wherein the first layer 3 routing decision and the second layer 3 routing decision are Equal Cost Multi-Path (ECMP) routing decisions.

16. The method of claim 14, wherein the first layer 3 routing decision is based on at least one first cost assigned to the at least one first intermediate node device, and wherein the at least one first cost assigned to the at least one first intermediate node device is modified based on the first flow control information to at least one second cost assigned to the at least one first intermediate node device that is greater than a third cost assigned to the at least one second intermediate node device based on the second flow control information.

17. The method of claim 14, wherein the first flow control information is received directly from the at least one first intermediate node device and the second flow control information is received directly form the at least one second intermediate node device.

18. The method of claim 14, further comprising:
  receiving, by a controller device, the first flow control information from the at least one first intermediate node device;
  receiving, by the controller device, the second flow control information from the at least one second intermediate node device; and
  providing, by the controller device to the sender node device, the first flow control information from the at least one first intermediate node device and the second flow control information from the at least one second intermediate node device.

19. The method of claim 14, wherein the first flow control information includes at least one pause frame and the second flow control information includes at least one pause frame.

20. The method of claim 19, wherein the first flow control information includes a plurality of pause frames received over at least one time period and the second flow control information includes a plurality of pause frames received over the at least one time period.

* * * * *